(12) United States Patent
Otaguro et al.

(10) Patent No.: US 7,592,405 B2
(45) Date of Patent: Sep. 22, 2009

(54) FLUORINE-CONTAINING PHOTOCURABLE COMPOSITION

(75) Inventors: Tsuneyuki Otaguro, Sakura (JP);
Hiroshi Kinoshita, Chiba (JP);
Kiyofumi Takano, Ichihara (JP);
Hirofumi Yamaguchi, Chiba (JP)

(73) Assignee: DIC Corporation, Tokyo (JP)

( * ) Notice: Subject to any disclaimer, the term of this patent is extended or adjusted under 35 U.S.C. 154(b) by 652 days.

(21) Appl. No.: 10/579,773

(22) PCT Filed: Nov. 18, 2004

(86) PCT No.: PCT/JP2004/017511
§ 371 (c)(1),
(2), (4) Date: May 18, 2006

(87) PCT Pub. No.: WO2005/049667
PCT Pub. Date: Jun. 2, 2005

(65) Prior Publication Data
US 2007/0066779 A1 Mar. 22, 2007

(30) Foreign Application Priority Data
Nov. 21, 2003 (JP) .............................. 2003-392098

(51) Int. Cl.
*C08F 214/18* (2006.01)
(52) U.S. Cl. ...................... 526/242; 526/247; 526/319; 526/318.43
(58) Field of Classification Search ................. 526/242, 526/247, 319, 318.43
See application file for complete search history.

(56) References Cited
U.S. PATENT DOCUMENTS

| | | | | |
|---|---|---|---|---|
| 3,758,447 A | * | 9/1973 | Falk et al. ...................... 442/80 |
| 3,819,666 A | * | 6/1974 | Kleiner et al. ................. 554/42 |
| 3,886,201 A | * | 5/1975 | Falk et al. .................... 560/153 |
| 2003/0078352 A1 | | 4/2003 | Miyazawa et al. ........... 526/245 |
| 2004/0236046 A1 | | 11/2004 | Miyazawa et al. ........... 526/245 |

FOREIGN PATENT DOCUMENTS

| | | |
|---|---|---|
| JP | 9-157326 | 6/1997 |
| JP | 09-301925 | 11/1997 |
| JP | 2000-044650 | 2/2000 |
| JP | 2001-072646 | 3/2001 |
| JP | 2002-145936 | 5/2002 |
| JP | 2002-275220 | 9/2002 |
| JP | 2003-40840 | 2/2003 |

\* cited by examiner

*Primary Examiner*—David Wu
*Assistant Examiner*—Michael M Bernshteyn
(74) *Attorney, Agent, or Firm*—Edwards Angell Palmer & Dodge LLP

(57) ABSTRACT

A fluorine-containing photocurable composition containing a (meth)acrylate having a fluorinated alkyl group (A) and a photopolymerization initiator (B). The (meth)acrylate (A) includes a group represented by general formula (1) and two or more (meth)acryloyl groups, and a fluorine atom content in one molecule of the acrylate is 25% by weight or more, and molecular weight of the (meth)acrylate is 500 to 4000

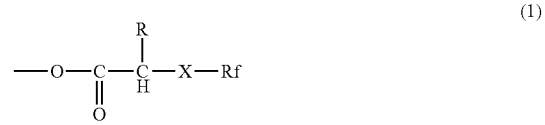

(in the general formula (1), R represents a hydrogen atom or alkyl group having 1 to 4 carbon atoms; X represents an alkylene chain, which may have a hetero atom, or a connecting group represented by the following general formula (2); and Rf represents a fluorinated alkyl group)

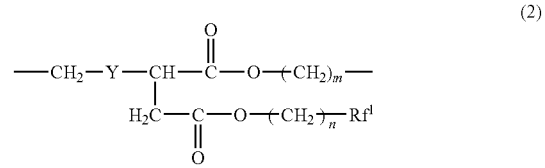

(in the formula (2), Y represents an oxygen atom or a sulfur atom, m and n are an integer of 1 to 4 which may be the same as or different from each other; and $Rf^1$ is a fluorinated alkyl group).

8 Claims, No Drawings

FLUORINE-CONTAINING PHOTOCURABLE COMPOSITION

TECHNICAL FIELD

The present invention relates to a fluorine-containing photocurable composition.

BACKGROUND ART

Conventionally, it has been very useful to use (meth)acrylate having a fluorinated alkyl group independently or to use a curable composition comprising said acrylate as an optical material for optical lenses or the like, in order to achieve both optical characteristics such as reducing a refractive index and mechanical characteristics (strength) caused by a crosslinking reaction. Accordingly, many kinds of said (meth)acrylates, manufacturing methods thereof, and compositions comprising said (meth)acrylate have been proposed. The (meth)acrylate having a fluorinated alkyl group is also useful as a surface-active agent, a surface-modifying agent and a raw material for the agents, which can achieve surface characteristics such as water repellent and/or oil repellent property, smoothing property, chemical resistance and stain guard property due to a high electronegativity, that is, low polarizability peculiar to a fluorine atom in the compound.

For example, (meth)acrylate which is obtained by a condensation reaction between trimethylol propane, perfluoroalkyl carboxylic acid, and (meth)acrylic acid has been proposed as a polyfunctional (meth)acrylate having a fluorinated alkyl group (for example, please refer to Japanese Unexamined Patent Application, First Publication, 9-157326, pages 2 to 4. Hereinafter, the document is cited as patent document 1). However, this (meth)acrylate of patent document 1 is a compound wherein the perfluoroalkyl group is directly combined with a carbon atom of a carbonyl group in an ester bond. Accordingly, the electron density of said carbon atom tends to be decreased and hydrolysis affects the (meth)acrylate easily, and thus, an obtained cured product has problems in that performances such as the optical characteristics, mechanical characteristics and the like may not be maintained over a long period of time. Moreover, accumulative property of perfluoroalkyl carboxylic acid ($C_nF_{2n+1}$COOH), which is a raw material or product produced after the hydrolysis, in a living body and in the environment is recognized as a problem particularly in U.S. and therefore perfluoroalkyl carboxylic acid is a compound which should be avoided from the viewpoint of safety.

Furthermore, as polyfunctional urethane acrylate having a fluorinated alkyl group, for example, a polycondensed reaction product of isophorone diisocyanate, mono- or di-alcohol having a fluorinated alkyl group, and polyfunctional acrylate monomer having a hydroxyl group has been proposed (for example, please refer to Japanese Unexamined Patent Application, First Publication, 2002-145936, pages 3 to 5. Hereinafter, the document is cited as patent document 2). Since the compound proposed in patent document 2 is a compound wherein a perfluoroalkyl group is not combined directly with a carbon atom in a carbonyl group, deterioration of a cured product due to hydrolysis is not caused easily. However, the compound has a structure in which an acrylate portion (crosslinking point) bonds with a fluorinated alkyl group via isophorone diisocyanate. Accordingly, a molecular weight of the compound per molecule is large, and the functional group density of a (meth)acryloyl group is low and the mechanical characteristics of a cured product become insufficient.

Furthermore, as a method for manufacturing a polyfunctional urethane acrylate having a fluorinated alkyl group, methods are proposed in which said acrylate is produced by using diepoxide having a fluorinated alkyl group or diol having a fluorinated alkyl group as a raw material (for example, please refer to Japanese Unexamined Patent Application, First Publication, 9-301925, pages 3 to 5, and Japanese Unexamined Patent Application, First Publication, 2001-072646, pages 3 to 4.) Hereinafter, the documents are cited as patent documents 3 and 4). However, since there are acryloyl groups (crosslinking point) at both terminal ends of a fluorinated alkylene chain via the residues of a hydroxyl group or an epoxy group in both documents, a fluorinated alkylene chain is incorporated in a network structure of a cured product. Accordingly, the surface properties originated from a fluorine atom are not sufficient, since it is difficult for a fluorine atom to exist on the surface of the cured product effectively and —$CF_3$, which can contribute to decrease surface tension, does not exist on the surface.

Moreover, for example, a reactant which is obtained by reacting fluorine-containing acrylate, which has a hydroxyl group, and isocyanate having an acryloyl group has been proposed as fluorinated alkyl group containing (meth)acrylate which has two (meth)acryloyl groups (for example, please refer to Japanese Unexamined Patent Application, First Publication, 2000-044650, pages 3 to 7. Hereinafter, this document is cited as patent document 5).

The compound proposed by patent document 5 is excellent in surface characteristics as compared with the compounds proposed by patent documents 3 and 4, since a fluorinated alkyl group of patent document 5 is pendant from the three dimensional structure generated by the curing reaction. However, since the crosslinking points are bonded to each other by the chain structure wherein a flexible alkylene chain is a main structure, therefore, an obtained three dimensional network structure itself is also flexible, and mechanical characteristics of the cured product obtained become insufficient.

In view of the aforementioned circumstances, problems to be solved by the present invention are to provide a fluorine-containing photocurable composition including (meth)acrylate having a fluorinated alkyl group, wherein the composition can be used suitably for an optical material, coating material and the like, and a cured product obtained from the composition having excellent surface characteristics, optical characteristics and mechanical characteristics, and also excellent long-term stability of such characteristics due to excellent hydrolysis resistance thereof.

DISCLOSURE OF INVENTION

As a result of studying the aforementioned problems to be solved, the inventors of the present invention found that an excellent composition can be obtained when (meth)acrylate having a molecular weight of 500 to 4000 is included therein, and the (meth)acrylate has two or more (meth)acryloyl groups and a functional group represented by the general formula (1) wherein a fluorinated alkyl group is provided at the terminal end(s), and the fluorine-containing ratio per molecule of the (meth)acrylate is 25% by weight or more. The present invention can be achieved due to the findings such that; excellent surface characteristics are achieved since a fluorine atom can be suitably provided at the surface of a cured product due to the (meth)acrylate which has a fluorinated alkyl group at the terminal end(s) of a molecule; mechanical characteristic can be achieved since the molecular weight of the (meth)acrylate is 500 to 4000 and two or more crosslinking points are present; excellent optical characteristics and surface characteristics of a cured product can be achieved due to the high contents of fluorine atoms; and excellent long term stability of the aforementioned characteristics can be achieved since an alkylene chain or the like is present between a fluorinated alkyl group and carbon in a carbonyl group in an ester bond and therefore excellent hydrolysis resistance can be achieved.

That is, the present invention provides a fluorine-containing photocurable composition containing a (meth)acrylate having a fluorinated alkyl group (A) and a photopolymerization initiator (B); wherein the (meth)acrylate (A) includes a functional group (A-i) represented by general formula (1), in which a fluorinated alkyl group is included at the terminal end thereof, and two or more (meth)acryloyl groups (A-ii), and the fluorine atom content in one molecule of the (meth)acrylate (A) is 25% by weight or more, and molecular weight of the (meth)acrylate (A) is 500 to 4000,

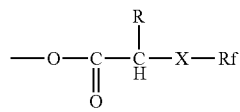

(1)

(in the general formula (1), R represents a hydrogen atom or alkyl group having 1 to 4 carbon atoms; X represents an alkylene chain, which may have a hetero atom, or a connecting group represented by the following general formula (2); and Rf represents a fluorinated alkyl group)

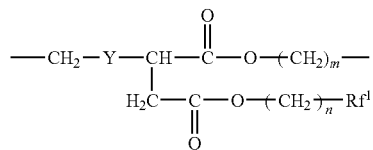

(2)

(in the formula (2), Y represents an oxygen atom or a sulfur atom; m and n are an integer of 1 to 4 which may be the same or different from each other; and $Rf^1$ is a fluorinated alkyl group).

EFFECTS OF THE INVENTION

A cured product obtained from the fluorine-containing photocurable composition of the present invention has excellent surface characteristics, optical characteristics and mechanical characteristics, and furthermore has excellent hydrolysis resistance which enables long-term stability of the aforementioned characteristics. The cured product can be suitably used for an optical material, a coating material and the like.

BEST MODE FOR CARRYING OUT THE INVENTION

Hereinafter, the present invention is explained in detail.

The present invention relates to a fluorine-containing photocurable composition which contains (meth)acrylate having a fluorinated alkyl group. A cured product obtained from the composition is excellent in surface characteristics, optical characteristics, mechanical characteristics and hydrolysis resistance, and therefore it can be suitably used as an optical material, a coating material and the like.

According to the present invention, a fluorine-containing photocurable composition can be provided wherein a cured product obtained from the composition can have both optical characteristics and mechanical characteristics with sufficiently good balance, and the photocurable composition can be suitably used for an optical material or the like. In the present invention, a (meth)acryloyl group can mean an acryloyl group and/or a methacryloyl group. Moreover, a fluorinated alkyl group can mean an alkyl group wherein all of the hydrogen atoms included in the alkyl group are substituted with fluorine atoms perfluoroalkyl group) and/or an alkyl group wherein one or more hydrogen atoms are substituted with a fluorine atom (for example, $HCF_2CF_2CF_2CF_2$— and the like). In addition, a fluorinated alkyl group including an oxygen atom therein can also be included in the scope of the fluorinated alkyl group of the present invention (for example, $CF_3$—$(OCF_2CF_2)_2$— and the like).

The (meth)acrylate having a fluorinated alkyl group (A) used in the present invention has to include at the terminal end(s) a functional group (A-i) which has a fluorinated alkyl group and which is represented by the general formula (1).

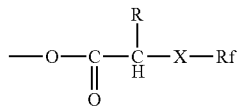

(1)

(In the general formula (1), R represents a hydrogen atom or an alkyl group having 1 to 4 carbon atoms, X represents an alkylene chain which may have a hetero atom or a connecting group represented by the general formula (2) and Rf represents a fluorinated alkyl group.)

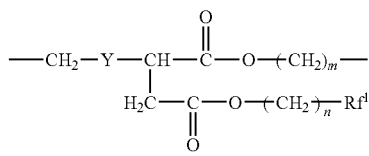

(2)

(In the formula (2), Y represents an oxygen atom or a sulfur atom, m and n are an integer of 1 to 4 which may be the same or different from each other, and $Rf^1$ is a fluorinated alkyl group.)

In the structure represented by the general formula (1), an alkylene chain and/or the like exist between a fluorinated alkyl group and a carbon atom of a carbonyl group in an ester bond. Accordingly, problems of degradation caused by hydrolysis tend not to occur, and therefore, excellent long-term stability of characteristics of the cured product can be achieved. Moreover, since a fluorinated alkyl group(s) in this structure exists in the terminal end(s) of a molecule, the fluorinated alkyl group is not incorporated as a part in a network formed by a crosslinking reaction. Furthermore, this structure represented by the general formula (1) can have —$CF_3$ which can greatly contribute to an ability of decreasing surface tension. Accordingly, when the composition of the present invention is used as a coating material, a fluorine atom can be effectively arranged on the surface of the coating, and the surface characteristics due to the fluorine atom can be achieved effectively.

Furthermore, it is necessary that the (meth)acrylate having a fluorinated alkyl group (A) used in the present invention has two or more (meth)acryloyl groups (A-ii). This means that the (meth)acrylate can have two or more crosslinking points per molecule at the time of a curing reaction, and the (meth) acryloyl groups are required in order to form a strong three-dimensional network structure.

Furthermore, it is necessary for the (meth)acrylate (A) that the fluorine atom content per molecule be 25% by weight or more. This condition is required to achieve the surface characteristics and optical characteristics due to the fluorine atom. When (meth)acrylate having a fluorinated alkyl group wherein the fluorine atom content is less than 25% by weight is used, it is necessary for the amount of said (meth)acrylate to be increased, or another reactive and/or non-reactive compound having high fluorine atom content to be used in combination with the (meth)acrylate or the like, in order to achieve the sufficient surface characteristics and optical characteristics. As a result, since problems arise such as economical disadvantages, it is necessary to conduct sufficient additional examinations of the compatibility in order to determine a detailed compounding ratio for the composition and to make suitable optical characteristics arise, and the like.

Moreover, it is necessary that a molecular weight of the (meth)acrylate of the present invention be 500 to 4000. If the molecular weight is larger than 4000, it is not preferable, since crosslinking density decreases and mechanical characteristics become insufficient. If the molecular weight is less than 500, it is not preferable, since sufficient amounts of a fluorine atom cannot be included in a (meth)acrylate.

By using the (meth)acrylate having a fluorinated alkyl group which satisfies the aforementioned conditions of the present invention, it is possible to achieve excellent surface characteristics and optical characteristics of a cured product due to the fluorine atom. Furthermore, due to the use of the (meth)acrylate, it is possible to provide a more rigid three-dimensional network structure, and mechanical characteristics (mechanical strength) can be improved. As a result, a cured product is obtained which can satisfy these plural characteristics and is excellent in hydrolysis resistance.

Among them, it is particularly preferable from the viewpoint of further excellent characteristics that the fluorine atom content of the (meth)acrylate having a fluorinated alkyl group (A) be 30 to 65% by weight, and/or that a molecular weight of the (meth)acrylate be 600 to 3500.

It is also preferable that the aforementioned functional group (A-i) and two or more aforementioned (meth)acryloyl groups (A-ii) be each independently bonded to a quaternary carbon, cyanurate ring or phosphoryl group (A-iv) via a different or the same alkylene chain (A-iii) which has 1 to 5 carbon atoms and may have an oxygen atom; and the quaternary carbon, cyanurate ring, or phosphoryl group (A-iv) to which the functional group (A-i) is connected via the alkylene chain (A-iii) be further bonded by at least one of the two or more (meth)acryloyl groups (A-ii) via the alkylene chain (A-iii). Due to the structure, when a three-dimensional network structure is formed, it is possible to provide a quaternary carbon, cyanurate ring or phosphoryl group (A-iv), which has a low freedom degree, at the positions which combine the crosslinking points with each other. As a result, the three-dimensional network structure itself can become more rigid, and excellent mechanical characteristics of a cured product can be achieved. Furthermore, a fluorinated alkyl group can be provided in the vicinity of the crosslinking point. Accordingly, this structure is very preferable to achieve both mechanical characteristics and optical characteristics. It is desirable that the alkylene chain (A-iii) be a short chain for the aforementioned reasons, and it is particularly preferable that the alkylene chain (A-iii) be an alkylene chain having 1 to 3 carbons or oxyalkylene chain having 1 to 3 carbons.

It is preferable that X in the general formula (1), be an alkylene chain represented by the following general formula (3) since superior hydrolysis resistance of the obtained cured product can be achieved.

$$-(CH_2)_p-Z_q-(CH_2)_r- \quad (3)$$

(In the general formula (3), Z represents $-NR-SO_2-$ (R represents a hydrogen atom or alkyl group having 1 to 24 carbon atoms) or a sulfur atom, oxygen atom, or nitrogen atom which has a hydrogen atom or alkyl group having 1 to 24 carbons; p represents an integer of 0 to 4; q represents an integer of 0 or 1; r represents an integer of 0 to 20; and $1 \leq p+r \leq 20$.)

Among the compounds of the present invention, it is especially preferable to use a compound wherein X in the general formula (1) is an alkylene chain represented by the general formula (3) (wherein Z represents $-NR-SO_2-$ (R represents a hydrogen atom or alkyl group having 1 to 24 carbon atoms) or a sulfur atom, an oxygen atom, or a nitrogen atom which has a hydrogen atom or alkyl group having 1 to 24 carbons; p represents 1; q represents 1; r represents an integer of 0 to 19), and/or a compound wherein X in the general formula (1) is a connecting group represented by the general formula (2) (wherein $Rf^1$ represents $-C_nF_{2n+1}$ (n represents an integer of 1 to 20)) and $R_f$ in the general formula (1) represents $-C_nF_{2n+1}$ (n represents an integer of 1 to 20) which may be the same as or different from said $Rf^1$, since these compounds can be produced by the Michael addition reaction described below and it is possible to achieve effective performances originating from a fluorine atom due to the presence of the perfluoroalkyl group as the fluorinated alkyl group. When a fluorinated alkyl group other than a perfluoroalkyl group is used, it is preferable that the fluorinated alkyl group other than the perfluoroalkyl group has good compatibility with other components described below which are blended if needed, that is, the fluorinated alkyl group can improve light-permeability and the like. It is also preferable that the fluorinated alkyl group can provide required effects when a cured product is required to impart flexible toughness and adhesion. The structure and the kinds of the fluorinated alkyl group can be suitably selected in accordance with the use and suitable level of required characteristics and the like.

Since it becomes possible to achieve very excellent surface characteristics, optical characteristics and mechanical characteristics when it is used, it is most preferable that the compound of the present invention be a compound wherein Z in the general formula (3) represents $-NR-SO_2-$ (R represents alkyl group having 1 to 6 carbon atoms) or a sulfur atom or nitrogen atom which has a hydrogen atom or alkyl group having 1 to 6 carbon atoms; or a compound wherein Y in the general formula (2) is a sulfur atom; wherein the carbon number n of $Rf^1$ is 4, 6 or 8 and the carbon number n of Rf in the general formula (1) is 4, 6 or 8. Furthermore, it is preferable that R in the general formula (1) be a hydrogen atom or a methyl group, from the viewpoint of the industrial availability of raw materials thereof and production facility wherein such compounds can be produced by the Michael addition reaction.

As the (meth)acrylate having a fluorinated alkyl group (A) used in the present invention, compounds represented by the following general formulae (I) to (X) can be mentioned, for example.

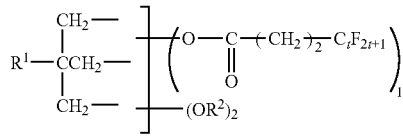
(I)

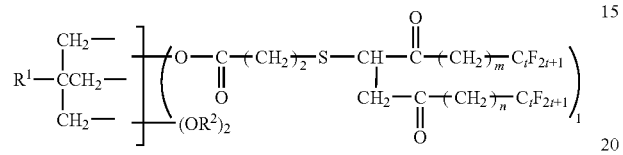
(II)

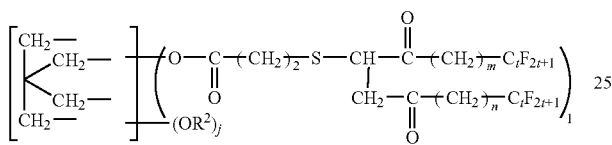
(III)

(In the general formulae (I) to (III), $R^1$ represents an alkylol group having 1 to 3 carbon atoms, $CH_2=CHCO_2CH_2-$, $CH_2=C(CH_3)CO_2CH_2-$, a straight chain alkyl group having 1 to 4 carbon atoms, or a hydroxyl group, and $R^2$ represents a (meth)acryloyl group, m and n represent an integer of 1 to 4 which may be the same as or different from each other, and t represents 4, 6, or 8, i represents 1 or 2, and j represents 2 or 3, and i+j=4.)

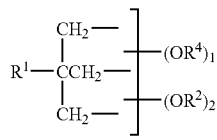
(IV)

(In the general formula (IV), $R^1$ and $R^2$ are the same as those of the general formulae (I) to (III), and $R^4$ represents a group wherein $HS(CH_2)_2C_tF_{2t+1}$ or $HN(C_3H_7)(CH_2)_2C_tF_{2t+1}$ (in the formula, t represents 4, 6 or 8) adds to a (meth)acryloyl group by a Michael addition reaction.)

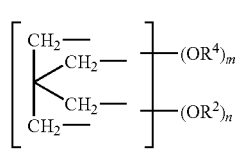
(V)

(In the general formula (V), $R^2$ and $R^4$ are the same as those of the general formulae (I) to (IV), m represents 1 or 2, and n represents 2 or 3, and m+n=4.)

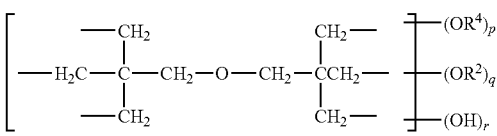
(VI)

(In the general formula (VI), $R^2$ and $R^4$ are the same as those of the general formulae (I) to (IV), p represents an integer of 1 to 4, q represents an integer of 2 to 5, r represents an integer of 0 to 3, and p+q+r=6.)

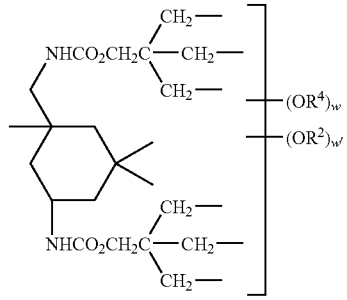
(VII)

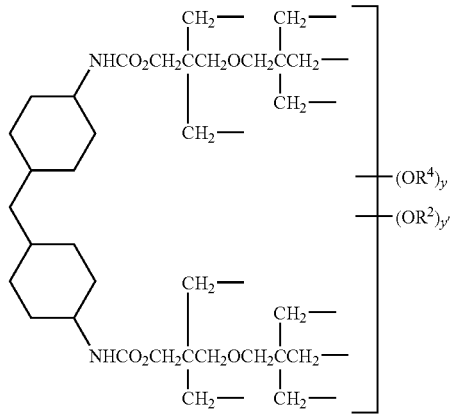
(VIII)

(In the general formulae (VII) to (VIII), $R^2$ and $R^4$ are the same as those of the general formulae (I) to (IV), w represents an integer of 1 to 4, w' represents an integer of 2 to 5, and w+w'=6, y represents an integer of 1 to 8, and y' represents an integer of 2 to 9, and y+y'=10.)

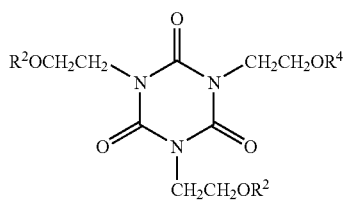
(IX)

(In the general formula (IX), $R^2$ and $R^4$ are the same as those of the general formulae (I) to (IV).)

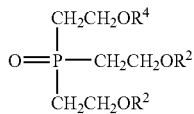
(X)

(In the general formula (X), $R^2$ and $R^4$ are the same as those of the general formulae (I) to (IV).)

In the aforementioned general formulae, the position of —(OR), which combines with —CH$_2$— directly or the like is not restricted, and it can be determined as required.

Specific examples of the aforementioned (meth)acrylate having a fluorinated alkyl group (A) include compounds described below. Here, the following examples are examples for acrylate, and each acryloyl group in the following examples may be replaced with a methacryloyl group. Furthermore, although the following examples are examples wherein R in the general formula (1) is a hydrogen atom, any one hydrogen atom in the methylene group bonded with a carbon atom in the carbonyl group may be replaced with a methyl group.

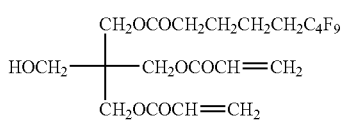
(I)

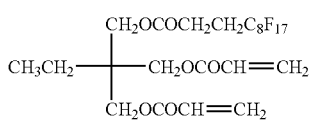
(II)

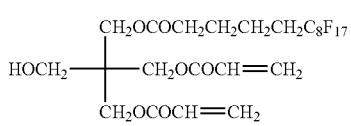
(III)

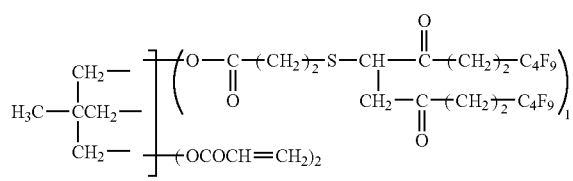
(IV)

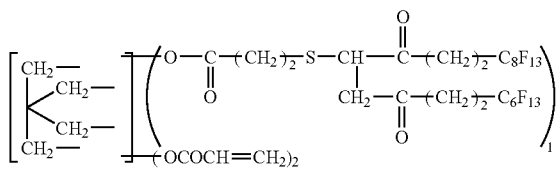
(v)

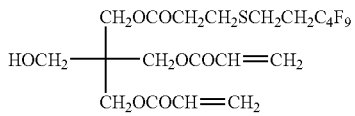
(vI)

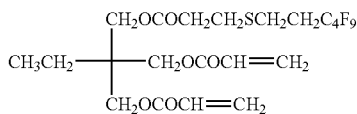
(vII)

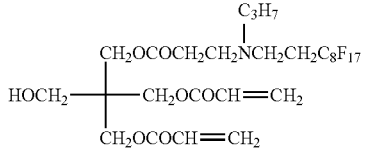
(vIII)

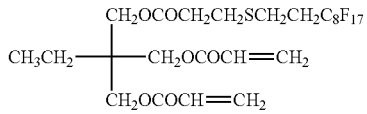
(Ix)

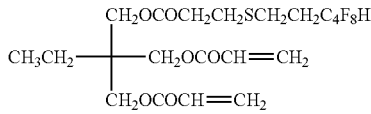
(x)

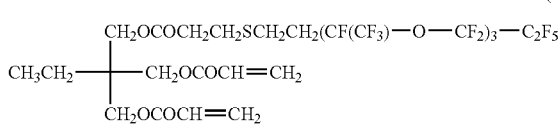
(xI)

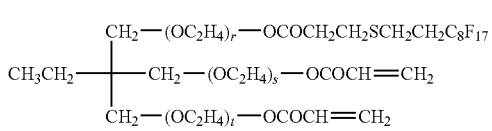
(xII)

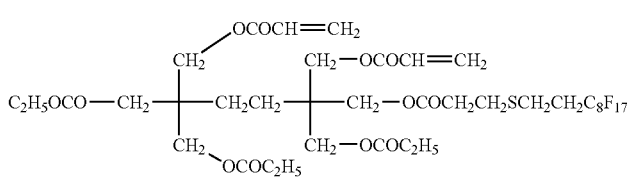
(xIII)

-continued
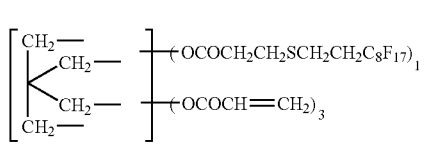 (xIv)
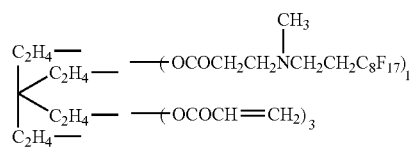 (xv)
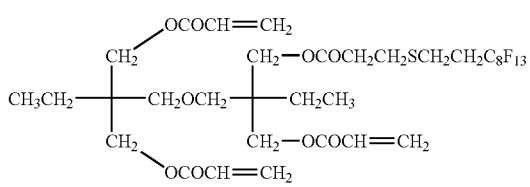 (xvI)
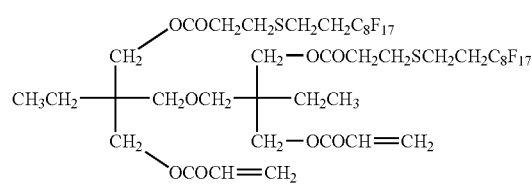 (xvII)
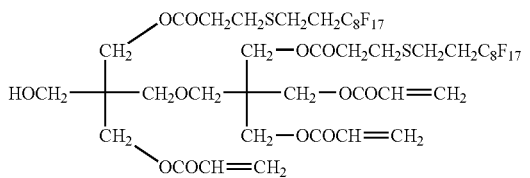 (xvIII)
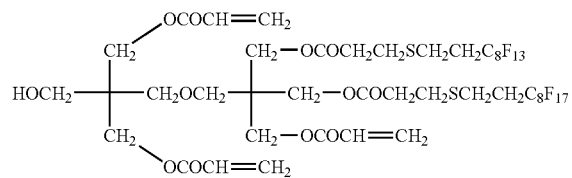 (xIx)
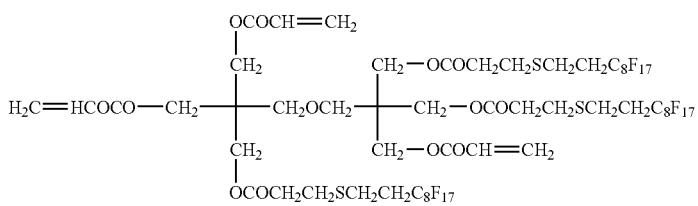 (xx)
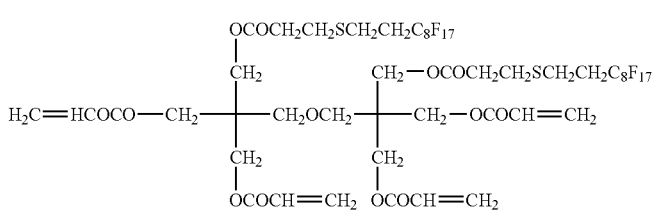 (xxI)
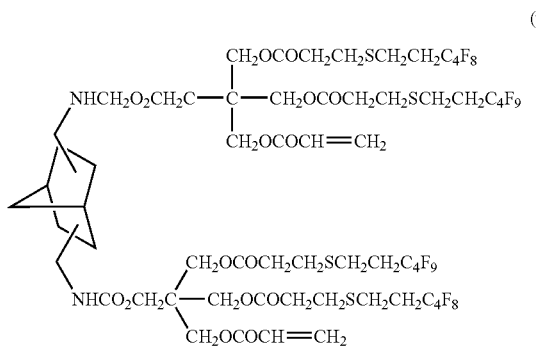 (xxII)
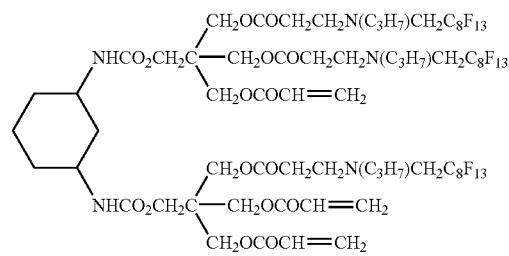 (xxIII)

-continued

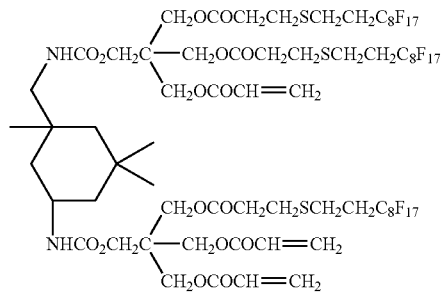
(xxIv)

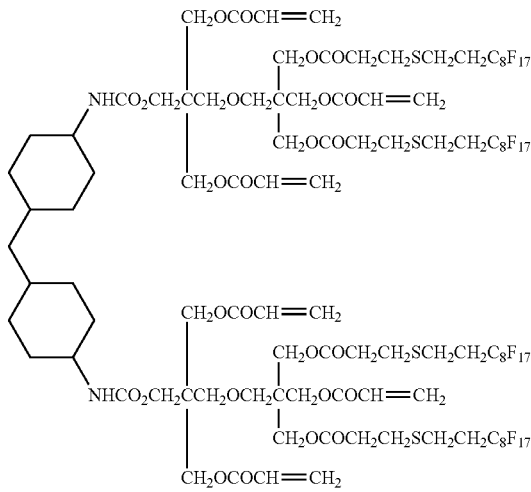
(xxv)

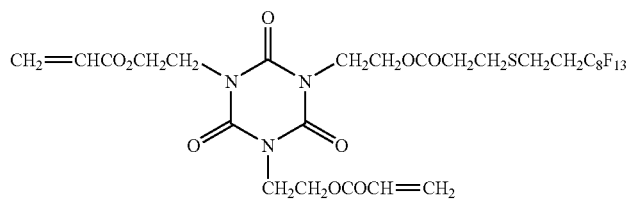
(xxvI)

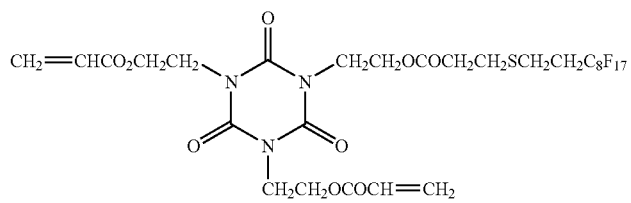
(xxvII)

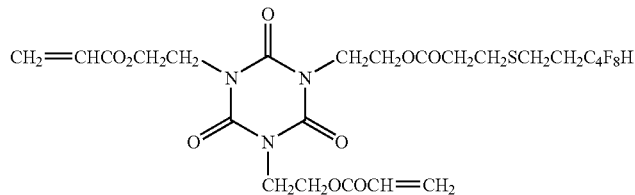
(xxvIII)

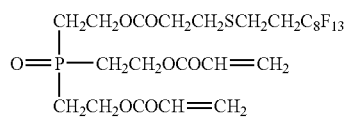
(xxIx)

(xxx)

There are no particular restrictions as to how to produce the aforementioned (meth)acrylate having a fluorinated alkyl group (A). For example, examples of a manufacturing method of the (meth)acrylate include: a method wherein a Michael addition reaction is conducted between a compound (a1) having three or more (meth)acryloyl groups and a compound having a fluorinated alkyl group and an active hydrogen; a method wherein alkyl carboxylic acid having a fluorinated alkyl group, polyhydric alcohol, and (meth)acrylic acid are used as raw materials, and the compounds are reacted in the presence of an acid catalyst such as hydrochloric acid, sulfuric acid or the like and a polymerization inhibitor such as hydroquinone for 3 to 10 hours at the temperature of 80 to 120° C., while the water content generated by condensation reaction is removed: and the like.

Since the former manufacturing method using the Michael addition reaction is a method wherein an addition reaction is used, by-products are not produced and it is possible to carry out the reaction under mild conditions as described below. Moreover, this method can adjust easily the content ratio of a fluorine atom in one molecule, the number of a functional group in a (meth)acryloyl group, and the like.

For this reason, the aforementioned method is preferable to obtain the (meth)acrylate having a fluorinated alkyl group usable for the fluorine-containing photocurable composition of the present invention.

Hereinafter, the synthetic method of producing a (meth)acrylate having a fluorinated alkyl group using the Michael addition reaction is described. As the aforementioned compound (a1) which has three or more (meth)acryloyl groups, there are no specific restrictions insofar as the compound has three or more (meth)acryloyl groups in one molecule. The compound (a1) can be suitably selected in accordance with the target use. From a viewpoint of acquisition availability of raw materials and speedy progress of a reaction under mild conditions and the like, it is preferable that the compound (a1) which has three or more (meth)acryloyl groups be a compound (a1-1) represented by the general formula (6), a compound (a1-2) represented by the general formula (7), a urethane (meth)acrylate (a1-3), a cyanurate ring containing tri(meth)acrylate (a1-4), and/or a phosphoric acid tri(meth)acrylate (a1-5).

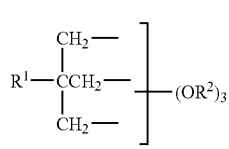

(6)

(In the general formula (6), $R^1$ represents a hydroxyl group, an alkyl group having 1 to 24 carbon atoms, an alkyl carbonyloxy group having 1 to 24 carbon atoms, $CH_2=CHCO_2CH_2-$, $CH_2=C(CH_3)CO_2CH_2-$, a (poly)oxyalkylene group, wherein the number of repeating units is one or more and terminal end(s) thereof is a hydrogen atom or is blocked with an alkyl group having 1 to 18 carbon atoms, or an alkylol group having 1 to 12 carbon atoms; and $R^2$ represents a (meth)acryloyl group.)

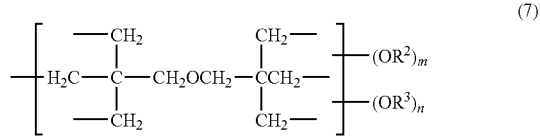

(7)

(In the general formula, $R^2$ represents a (meth)acryloyl group, $R^3$ represents a hydrogen atom or an alkyl carbonyl group having 1 to 18 carbon atoms, m represents an integer of 3 to 6, n represents an integer of 0 to 3, and m+n=6.)

Among them, a compound represented by the general formula (6) (wherein, $R^1$ represents a straight chain alkyl group having 1 to 4 carbon atoms, $CH_2=CHCO_2CH_2-$, $CH_2=C(CH_3)CO_2CH_2-$, or alkylol group having 1 to 3 carbon atoms), a compound represented by the general formula (7) (wherein, $R^3$ represents a hydrogen atom or an alkyl carbonyl group having 1 to 12 carbon atoms), Or urethane (meth)acrylate which can be obtained by reacting a hydroxyl group-containing (meth)acrylate (x1) which has two or more (meth)acryloyl groups and an isocyanate compound (x2) which has an alicyclic structure, is especially desirable.

Specific examples of the compound (a1) containing three or more (meth)acryloyl groups include the following compounds.

Examples of trifunctional (meth)acrylate include: ethylene oxide (EO) denatured glycerol acrylate (for example, NEW FRONTIER GE3A manufactured by Dai-Ichi Kogyo Seiyaku Co., Ltd. and the like), propylene oxide (PO) denatured glycerol triacrylate (for example, BEAM SET 720, manufactured by Arakawa Chemical Industries, Ltd. and the like), pentaerythritol triacrylate (PETA) (for example, NEW FRONTIER PET-3, manufactured by Dai-Ichi Kogyo Seiyaku Co., Ltd. and the like), trimethylolpropane triacrylate (TMTPA) (for example, NEW FRONTIER TMTP, manufactured by Dai-Ichi Kogyo Seiyaku Co., Ltd. and the like), caprolactone-denatured trimethylolpropane triacrylate (for example, EBECRY12047, manufactured by DAICEL-UCB Company, Ltd. and the like), hydroxypropyl acrylate (HPA) denatured trimethylolpropane triacrylate (for example, KAYARAD THE-330, manufactured by Nippon Kayaku Co., Ltd. and the like), (EO) or (PO) denatured trimethylolpropane triacrylate (for example, LUMICURE ETA-300, manufactured by Dainippon Ink and Chemicals Incorporated, NEW FRONTIER TMP-3P, manufactured by Dai-Ichi Kogyo Seiyaku Co., Ltd. and the like), alkyl-denatured dipentaerythritol triacrylate (for example, KAYARAD D-330, manufactured by Nippon Kayaku Co., Ltd, and the like), tris(acryloxy ethyl) isocyanurate (for example, FANCRL FA-731, manufactured by Hitachi Chemical Co., Ltd. and the like), EO-denatured phosphoric acid triacrylate (for example, Viscoat 3A, manufactured by Osaka Organic Chemical Industry Ltd.) and the like.

Examples of tetrafunctional (meth)acrylate include a ditrimethylolpropane tetraacrylate (DTMPTA) (for example, LUMICURE DTA-400, manufactured by Dainippon Ink and Chemicals Incorporated, and the like), pentaerythritol ethoxytetraacrylate (for example, DIABEAM UK-4154, manufactured by Mitsubishi Rayon Co., Ltd. and the like), pentaerythritol tetraacrylates (PETTA) (for example, NK ESTER A-TMMT, manufactured by Shin-nakamura Chemical Corporation, and the like) and the like.

Examples of a pentafunctional or hexafunctional (meth)acrylate include a dipentaerythritol hydroxypentaacrylate (for example, SR-399E, manufactured by Kayaku Sartomer Company Inc, and the like), alkyl-denatured dipentaerythritol pentaacrylate (for example, KAYARAD D-310, manufactured by Nippon Kayaku Co., Ltd.), dipentaerythritol hexaacrylate (for example, DAP-600, manufactured by Dainippon Ink and Chemicals Incorporated), a mixture of dipentaerythritol penta or hexa acrylate base and polyfunctional monomer (for example, LUMICURE DPA-620 manufactured by Dainippon Ink and Chemicals Incorporated) and the like.

These compounds may be used singly or in combination of two or more. Furthermore, these compounds may be used in combination with other compound(s) wherein the number of acryloyl groups and/or the structure thereof is different.

Furthermore, in general, a commercially available product of the aforementioned compounds tends to be a mixture wherein one or more other compound(s) having a different number of (meth)acryloyl groups as compared with a target compound are included in addition to a main component which is a target compound. When such a mixture is used, it is possible to separate a target compound having a suitable number of (meth)acryloyl groups by a refining method such as chromatography, extraction and the like to obtain and use the target compound, but it is also possible to use the mixture as it is as required.

As the aforementioned compound (a1) used in the present invention, it is also possible to use the aforementioned urethane (meth)acrylate (a1-3). There is no restriction on the manufacturing method of the urethane (meth)acrylate (a1-3). For example, it is possible to obtain the (meth)acrylate by a polyaddition reaction or the like between a hydroxyl group-containing (meth)acrylate (x1) which has two or more (meth) acryloyl groups and an isocyanate compound.

Although it is possible to perform the aforementioned reaction without any catalyst, reaction assistants such as a urethanizing catalyst or the like can be used from the viewpoints of reaction efficiency and the like. Examples of the urethanizing catalyst include copper naphthenate, cobalt naphthenate, zinc naphthenate, dibutyl tin dilaurate, triethylamine, 1,4-diazabicyclo[2.2.2]octane, 2,6,7-trimethyl-diazabicyclo[2.2.2.]octane and the like. It is preferable that the catalyst be used in an amount of 0.01 to 10% by weight based on the total amounts of the hydroxyl group-containing (meth)acrylate (x1) and the isocyanate compound (x2) used as raw materials.

Examples of the hydroxyl group-containing (meth)acrylate (x1) include 2-hydroxy ethyl(meth)acrylate, pentaerythritol triacrylate, dipentaerythritol hydroxyl pentaacrylate, 2-hydroxy-3-acryloyloxypropyl(meth)acrylate (for example, BLEMMER GAM, manufactured by NOF Corporation, and the like.)

As the aforementioned isocyanate compound, ally of an aromatic isocyanate compound, an aliphatic isocyanate compound, an alicyclic isocyanate compound and the like can be used in the present invention. As examples of the compound, toluene diisocyanate, tolylene diisocyanate, norbornane diisocyanate, isophorone diisocyanate, hexamethylene diisocyanate, trimethyl hexamethylene diisocyanate, adamantyl diisocyanate, and the like can be mentioned. It is preferable that the isocyanate compound having an alicyclic structure be used from the viewpoint of high glass transition temperature, abrasion resistance and the like of a cured product obtained with the compound. For example, norbornane diisocyanate, isophorone diisocyanate, and/or adamantyl diisocyanate are preferably used for the present invention. That is, a urethane (meth)acrylate, which is obtained by the reaction between the hydroxyl group-containing (meth)acrylate (x1) which has two or more acryloyl groups and the isocyanate compound (x2) which has an alicyclic structure, is preferably used as the urethane(meth)acrylate (a1-3). In addition, the compound obtained by introducing a fluorinated alkyl group into a urethane(meth)acrylate (a1-3) by the Michael addition reaction can be manufactured such that a compound having a hydroxyl group is selected from the compounds (a1-1) and (a1-2), a fluorinated alkyl group is introduced to the selected compound by the Michael addition reaction, and then the obtained compound is reacted with an isocyanate compound, for example. The order of the steps of the reaction is not restricted.

Next, the compound which has a fluorinated alkyl group and active hydrogen is explained.

It is desirable that the compound which has a fluorinated alkyl group and active hydrogen be a compound (a2) represented by the general formula (5) or a compound represented by the general formula (4) from the viewpoint of industrial availability of raw materials and carrying out the Michael addition reaction easily.

$$Rf(CH_2)_rZH \qquad (4)$$

(In the general formula (4), r represents an integer of 0 to 20, Rf represents $-C_nF_{2n+1}$ (n represents an integer of 1 to 20), and Z represents $-SO_2-NR-$ (R represents a hydrogen atom or an alkyl group having 1 to 24 carbon atoms) or a sulfur atom, an oxygen atom, or a nitrogen atom which has a hydrogen atom or alkyl group having 1 to 24 carbon atoms.)

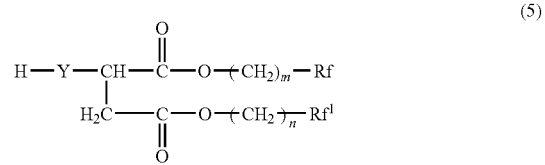

(In the general formula (5), Y represents an oxygen atom or a sulfur atom, m and n are an integer of 1 to 4 which may be different from or the same as each other, and Rf and $Rf^1$ represent $-C_nF_{2n+1}$ (n represents an integer of 1 to 20) which may be different from or the same as each other.)

Since it is possible to achieve excellent physical properties of a cured product and to select milder reaction conditions, it is particularly preferable that; in the general formula (4), Z represent $-SO_2-NR-$ (R represents an alkyl group having 1 to 6 carbon atoms) or a sulfur atom or a nitrogen atom which has a hydrogen atom or alkyl group having 1 to 6 carbon atoms, and carbon number n in Rf is 4, 6, or 8; and in the general formula (5), Y represent a sulfur atom, and the carbon number n in Rf and $Rf^1$ is 4, 6, or 8.

The (meth)acrylate having a fluorinated alkyl group (A) manufactured by using the fluorine-containing compound represented by the general formula (4) or (5) can have advantages regarding the application availability. Thai is, the (meth) acrylate having a fluorinated alkyl group (A) can achieve both optical and surface characteristics originated from a fluorine atom, and also can provide transparency of a cured product and compatibility with other components which are usable in combination as required when the (meth)acrylate (A) is applied to a photocurable composition. Namely, these characteristics can be achieved with sufficiently good balance.

As the fluorine-containing compound represented by the aforementioned general formula (4), the following compounds can be mentioned, for example. These compounds may be used singly or in combination of two or more.

| | |
|---|---|
| $C_4F_9SO_2N(CH_3)H$ | (a2-1) |
| $C_4F_9SO_2N(C_3H_7)H$ | (a2-2) |
| $C_4F_9CH_2CH_2N(C_8H_{17})H$ | (a2-3) |
| $C_4F_9CH_2CH_2SH$ | (a2-4) |
| $C_6F_{13}CH_2CH_2SO_2N(C_8H_{17})H$ | (a2-5) |
| $C_6F_{13}CH_2CH_2SH$ | (a2-6) |
| $C_6F_{13}CH_2CH_2N(C_4H_9)H$ | (a2-7) |
| $C_8F_{17}CH_2CH_2SH$ | (a2-8) |
| $C_8F_{17}CH_2N(C_3H_7)H$ | (a2-9) |
| $C_9F_{19}CH_2CH_2SH$ | (a2-10) |
| $C_{10}F_{21}CH_2CH_2CH_2N(C_3H_7)H$ | (a2-11) |
| $C_{12}F_{25}CH_2CH_2SH$ | (a2-12) |

As a manufacturing method of the fluorine-containing compound represented by the general formula (5), for example, examples thereof include a method wherein 2-hydroxysuccinic acid (hereinafter, described as malic acid) or 2-mercaptosuccinic acid (hereinafter, described as thiomalic acid) is reacted with a fluorinated alkyl group-containing alcohol or fluorinated alkyl group-containing mercaptan to form a diester. Specific examples of the compound represented by the general formula (5) include the following compounds.

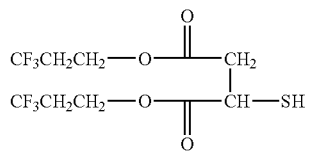
(a2-13)

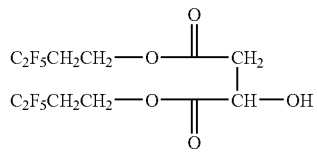
(a2-14)

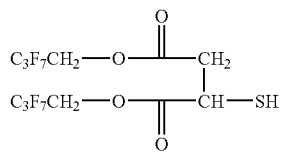
(a2-15)

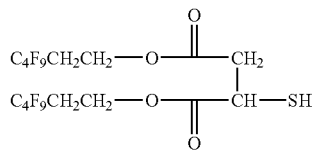
(a2-16)

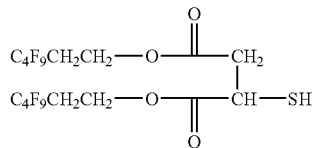
(a2-17)

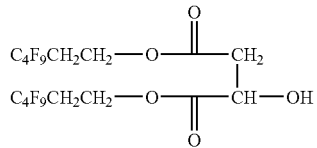
(a2-18)

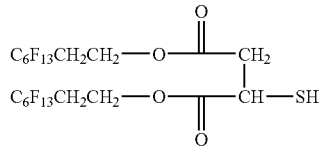
(a2-19)

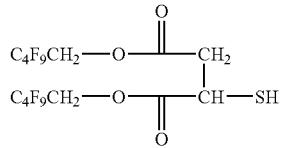
(a2-20)

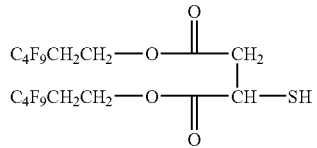
(a2-21)

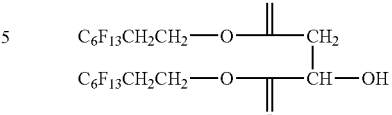
(a2-22)

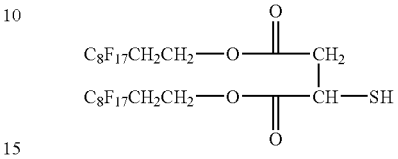
(a2-23)

The mixing ratio of the compound (a1) to the compound (a2) can be suitably adjusted in accordance with the aimed physical properties and intended use of a photocurable composition obtained from the compounds. It is not restricted at all insofar as the mixing ratio is a ratio wherein two or more (meth)acryloyl groups can exist in the (meth)acrylate after the Michael addition reaction. Specifically, in order to achieve the effects originated from a fluorine atom such as the optical characteristics and surface characteristics of a cured product in good efficiency, it is generally preferable that the compound (a2) be used in an amount of 0.01 to (k-2) mole (wherein k represents the average number of (meth)acryloyl groups included in one molecule of the compound (a1)) with respect to 1 mole of the compound (a1), and it is more preferable that the compound (a2) be used in an amount of 0.1 to (k-2) mole, and it is most preferable that the compound (a2) be used in an amount of 1.0 to (k-2) mole.

The reaction between the compound (a1) and the compound (a2) can be conducted by the usual Michael addition reaction. The reaction can be conducted without specific concern about the presence of a fluorine atom, and it is possible to conduct in either the presence or absence of a solvent. When a solvent is used for the reaction, solvent can be selected suitably in consideration of a solubility of the compounds (a1) and (a2) to the solvent, a boiling point thereof, the equipment to be used for the reaction and the like. Specific examples of the solvent include: esters such as ethyl acetate and butyl acetate; halogenated hydrocarbons such as dichloromethane and 1,2-dichloroethane; aromatic hydrocarbons such as toluene and xylene; ketones such as acetone, methyl ethyl ketone (hereinafter, it can be abbreviated to MEK), methyl isobutyl ketone (hereinafter, it can be abbreviated to MIBK); alcohols such as methanol, ethanol, and isopropanol; aprotic polar compounds such as dimethyl formamide, dimethylformacetamide, and dimethyl sulfoxide; ethers such as diethyl ether and tetrahydrofuran; and aliphatic hydrocarbons such as hexane and heptane. These solvents may be used singly or in combination of two or more. Among them, it is preferable to use esters, aromatic hydrocarbons, ketones, alcohols, ethers, dimethylformacetamide, dimethyl sulfoxide and the like, and it is particularly preferable that esters, ketones, alcohols, and ethers be used.

It is possible to perform the aforementioned reaction without a catalyst, but it is also possible to select and use as required a reaction assistant such as catalyst from the viewpoint of the reaction efficiency. Examples of the reaction assistant include: metal alcoholates such as sodium methoxide and sodium ethoxide; amines such as trimethylamine, triethylamine and 1,4-diazabicyclo-[2.2.2]-octane; metal hydrides such as sodium hydride and lithium hydride; ammonium salts such as benzyltrimethylammonium hydroxide and tetraammonium fluoride; and peroxides such as peracetic acid. Among them, it is preferable to use metal alcoholates, amines and ammonium salts, and it is particularly preferable that amines be used. The amount of the reaction assistant is not restricted, but for example, it may be 0.01 to 50% by mole, and is preferably 0.1 to 20% by mole based on 1 mole of the compound (a1) used as a raw material.

Furthermore, in accordance with the compound (a1) and compound (a2) to be used, it is also possible to use heat independently or in combination as an energy source for activating a reaction. Reaction temperature is 0° C. to reflux temperature in general, and it is preferably 20 to 100° C., and more preferably 20 to 70° C. When a solvent and the like are used for the reaction, solute concentration is usually 2 to 90% by weight, and preferably 20 to 80% by weight. A charging order of reaction materials is not restricted in particular. Furthermore, the product prepared in this way can be washed by extraction and/or refined using column chromatography and the like before the product is used, or the product can be used as it is without aforementioned treatments. Particularly, when a compound having many acryloyl groups is used as the compound (a1), it is very difficult to control the position to which the aforementioned compound (a2) is added. Therefore, a (meth)acrylate having a fluorinated alkyl group may be obtained as a mixture of many kinds of compounds such as compounds to which the compound (a2) is added to a different position(s) in each. In this case, it is not necessary to isolate a single substance by isolation and/or refining. It is possible to use the mixture as it is, which includes various compounds in which the position(s) provided by the Michael addition reaction is different in each.

As described above, the (meth)acrylate having a fluorinated alkyl group (A) used in the present invention can be produced under simpler and milder conditions with the Michael addition reaction of the compound (a1) and the compound (a2), without conducting a condensation reaction which uses a strong acid catalyst or the like. Moreover, various polyfunctional (meth)acrylates which can be easily synthesized or obtained as a commercial article can be used as a starting material in this method. Therefore, alteration such as controlling the number of (meth)acryloyl groups, the content of the fluorine atom per 1 molecule, the structure of the (meth)acrylate or the like can be conducted easily as required in accordance with required characteristics, the use and/or the purpose of the photocurable composition containing a (meth) acrylate having a fluorinated alkyl group (A). This method is a more effective manufacturing method than other methods.

Various compounds can be used as a photopolymerization initiator (B) used in the present invention, and examples thereof include B-1 to B-9 described below.

B-1: Benzophenone
B-2: Acetophenone
B-3: Benzoin
B-4: Benzoin ethyl ether
B-5: Benzoin isobutyl ether
B-6: Benzoin dimethyl ketal
B-7: Azobisisobutyronitrile
B-8: Hydroxy cyclohexyl phenyl ketone
B-9: 2-hydroxy-2-methyl-1-phenylpropane-1-one If required, it is also possible to add a photosensitizer such as an amine compound and a phosphorus compound to conduct the polymerization more rapidly.

These compounds can be used singly or in combination of two or more.

According to the knowledge of the inventors of the present invention, there is a case in which it is preferable to use two or more kinds of initiators in combination in accordance with the kind of light source, an aimed curing rate, an atmosphere wherein curing is conducted, and a structure (for example, a structure wherein curing is conducted over a quartz glass or over a high polymer film such as polyethylene terephthalate).

The suitable ratio of the photopolymerization initiator (B) included in the photocurable composition is 0.01 to 10% by weight, and is more preferably 0.1 to 7% by weight.

The method and the use of the fluorine-containing photocurable composition obtained as described above are not restricted. The fluorine-containing photocurable composition can be used in combination with other compound(s) in accordance with the use, purpose, performance required thereof and the like. In such a case, in order to achieve the optical characteristics and surface characteristics originating from a fluorine atom, it is desirable that the fluorine atom content in the photocurable composition is preferably 0.5% by weight or more, and preferably 2% by weight or more. It is desirable that a non-fluorine-containing mono(meth)acrylate (C) is used in the composition from the viewpoint of economical efficiency, mechanical properties such as hardness, and a high glass transition point (heat resistance) of the cured product obtained.

Various compounds can be used as the aforementioned non-fluorine-containing mono(meth)acrylate (C) without any restriction insofar as it is a compound which contains an acryloyl group and/or a methacryloyl group without including a fluorine atom in a molecule. Examples thereof include: aliphatic ester(meth)acrylates such as methyl(meth)acrylate, n-propyl(meth)acrylate, i-propyl(meth)acrylate, n-butyl (meth)acrylate, i-butyl(meth)acrylate, t-butyl(meth)acrylate, 2-ethyl hexyl(meth)acrylate, octyl(meth)acrylate, decyl (meth)acrylate, isodecyl(meth)acrylate, lauryl(meth)acrylate, stearyl(meth)acrylate, isostearyl(meth)acrylate, and the like; glycerol(meth)acrylate, 2-hydroxy(meth)acrylate, 3-chloro-2-hydroxy(meth)acrylate, glycidyl(meth)acrylate, allyl(meth)acrylate, butoxy ethyl(meth)acrylate, butoxy ethylene glycol(meth)acrylate, γ-methacryloxy propyl trimethoxy silane, 2-methoxy ethyl(meth)acrylate, methoxy diethylene glycol(meth)acrylate, methoxy dipropylene glycol(meth)acrylate, nonyl phenoxy polyethylene glycol(meth) acrylate, nonyl phenoxy polypropylene glycol(meth)acrylate, ARONIX M-5700 (manufactured by Toagosei Co., Ltd.), phenoxy ethyl(meth)acrylate, phenoxy dipropylene glycol(meth)acrylate, phenoxy polypropylene glycol(meth) acrylate, AR-200, M-260, AR-200, AR-204, AR-208, MR-200, MR-204 and MR-208 (these are manufactured by Daihachi Chemical Industry Co., Ltd), Viscoat 2000 and Viscoat 2308 (these are manufactured by Osaka Organic Chemical Industry Ltd.), polybutadiene(meth)acrylate, polyethylene glycol(meth)acrylate, polypropylene glycol(meth) acrylate, polyethylene glycol-polypropylene glycol(meth)acrylate, polyethylene glycol-polybutylene glycol(meth)acrylate, polystyryl ethyl(meth)acrylate, LIGHT-ESTER HOA-MS and LIGHT-ESTER HOMS (these are manufactured by Kyoeisha Chemical Co., Ltd.), benzyl(meth)acrylate, cyclohexyl(meth)acrylate, dicyclopentanyl(meth)acrylate, dicyclopentenyl diacrylate, isobornyl(meth)acrylate, methoxylated cyclodecatriene(meth)acrylate, phenyl(meth)acrylate, FANCRYL FA-512A and FANCRYLFA-512M (these are manufactured by Hitachi Chemical Co., Ltd.) and the like. These compounds can be used singly or in combination of two or more.

Among these compounds, the following compounds C-1 to C-11 and the like wherein a substituent of the ester position can have a cyclic structure are preferable, since compatibility with other components in the photocurable composition, transparency and light-permeable ability of a cured product obtained from the photocurable composition can be improved even when small amounts of the compounds are used.

C-1: Benzyl(meth)acrylate

C-2: Cyclohexyl(meth)acrylate

C-3: Dicyclopentanyl(meth)acrylate

C-4: Dicyclopentenyl(meth)acrylate

C-5: Isobornyl(meth)acrylate

C-6: Methoxylated cyclodecatriene(meth)acrylate

C-7: Phenyl(meth)acrylate

C-8: FANCRYL FA-512A (Dicyclopentenyl acrylate manufactured by Hitachi Chemical Co., Ltd.)

C-9: FANCRYL FA-512M (Dicyclopentenyloxy ethyl methacrylate manufactured by Hitachi Chemical Co., Ltd the Hitachi Chemical Co., Ltd.)

C-10: Adamantyl(meth)acrylate

C-11: Dimethyl adamantyl(meth)acrylate

It is also possible to include a non-fluorine-containing polyfunctional monomer (D). Various compounds can be used as the non-fluorine-containing polyfunctional monomer (D) without any restriction, insofar as the compound is a compound which has two or more photopolymerizable functional groups in a molecule and does not include a fluorine atom. Among them, a compound having a (meth)acryloyl group is preferable, since it can improve compatibility with other components in the photocurable composition and it can provide excellent light permeability for a cured product obtained from the photocurable composition. Specific examples of the compound include the following compounds D-1 to D23 and the like.

D-1: Ethylene glycol di(meth)acrylate

D-2: Diethylene glycol di(meth)acrylate

D-3: Triethylene glycol di(meth)acrylate

D-4: Polyethylene glycol di(meth)acrylate (Number average molecular weight: 150 to 1000)

D-5: Propylene glycol di(meth)acrylate

D-6: Dipropylene glycol di(meth)acrylate

D-7: Tripropylene glycol di(meth)acrylate

D-8: Polypropylene glycol di(meth)acrylate (Number average molecular weight: 150 to 1000)

D-9: Neopentyl glycol di(meth)acrylate

D-10: 1,3-butanediol di(meth)acrylate

D-11: 1,4-butanediol di(meth)acrylate

D-12: 1,6-hexanediol di(meth)acrylate

D-13: Hydroxy pivalate neopentyl glycol di(meth)acrylate

D-14:

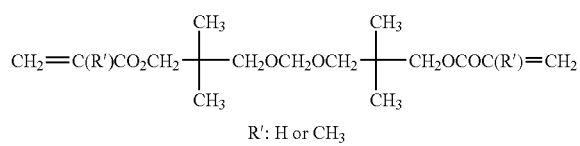

R': H or $CH_3$

D-15:

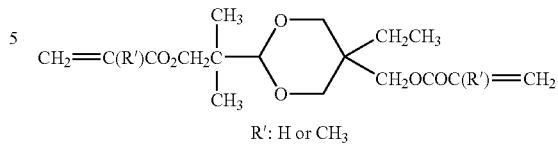

R': H or $CH_3$

D-16: Bisphenol A di(meth)acrylate

D-17: Trimethylol propan tri(meth)acrylate

D-18: Pentaerythritol tri(meth)acrylate

D-19: Dipentaerythritol hexa(meth)acrylate

D-20: Pentaerythritol tetra(meth)acrylate

D-21: Trimethylol propan di(meth)acrylate

D-22: Dipentaerythritol monohydroxy penta(meth)acrylate

D-23: Dicyclopentenyl diacrylate

Furthermore, commercially available examples of the monomer (D) other than the aforementioned compounds include: NEOMER NA-305, NEOMER BA-601, NEOMER TA-505, NEOMER TA-401, NEOMER PHA-405X, NEOMER TA 705X, NEOMER EA 400X, NEOMER EE 401X, NEOMER EP 405X, NEOMER HB 601X, and NEOMER HB 605X (they are manufactured by Sanyo Chemical Industries), and KAYARAD HY-220, KAYARAD HX-620, KAYARAD D-310, KAYARAD D-320, KAYARAD D-330, KAYARAD DPHA, KAYARAD DPCA-20, KAYARAD DPCA-30, KAYARAD DPCA-60 and KAYARAD DPCA-120 (they are manufactured by Nippon Kayaku Co., Ltd.

The non-fluorine-containing polyfunctional monomer (D) may be used singly or in combination of two or more.

Moreover, fluorine-containing (meth)acrylate (E) which is different from the aforementioned (meth)acrylate having a fluorinated alkyl group (A) can also be included in the photocurable composition of the present invention, insofar as the (meth)acrylate (E) does not decrease the effect of the present invention. There is no particular restriction on the (meth) acrylate (E). For example, examples of the (meth)acrylate (E) include the following compounds E-1 to E45 and the like.

E-1: $CH_2\!=\!CHCOOCH_2CH_2C_8F_{17}$

E-2: $CH_2\!=\!C(CH_3)COOCH_2CH_2C_8F_{17}$

E-3: $CH_2\!=\!CHCOOCH_2CH_2C_{12}F_{25}$

E-4: $CH_2\!=\!C(CH_3)COOCH_2CH_2C_{12}F_{25}$

E-5: $CH_2\!=\!CHCOOCH_2CH_2C_{10}F_{21}$

E-6: $CH_2\!=\!C(CH_3)COOCH_2CH_2C_{10}F_{21}$

E-7: $CH_2\!=\!CHCOOCH_2CH_2C_6F_{13}$

E-8: $CH_2\!=\!C(CH_3)COOCH_2CH_2C_6F_{13}$

E-9: $CH_2\!=\!CHCOOCH_2CH_2C_4F_9$

E-10: $CH_2\!=\!CFCOOCH_2CH_2C_6F_{13}$

E-11: $CH_2\!=\!C(CH_3)COOCH_2CH_2C_{20}F_{41}$

E-12: $CH_2\!=\!C(CH_3)COOCH_2CH_2C_4F_9$

E-13: $CH_2\!=\!C(CF_3)COO(CH_2)_6C_{10}F_{21}$

E-14: $CH_2\!=\!C(CH_3)COOCH_2CF_3$

E-15: $CH_2=CHCOOCH_2CF_3$

E-16: $CH_2=CHCOOCH_2C_8F_{17}$

E-17: $CH_2=C(CH_3)COOCH_2C_8F_{17}$

E-18: $CH_2=C(CH)COOCH_2C_{20}F_{41}$

E-19: $CH_2=CHCOOCH_2C_{20}F_{41}$

E-20: $CH_2=C(CH_3)COOCH_2CF(CF_3)_2$

E-21: $CH_2=C(CH_3)COOCH_2CFHCF_3$

E-22: $CH_2=CFCOOCH_2C_2F_5$

E-23: $CH_2=CHCOOCH_2(CH_2)_6CF(CF_3)_2$

E-24: $CH_2=C(CH_3)COOCH_2CF_2CFHCF_3$

E-25: $CH_2=C(CH_3)COOCH(C_2H_5)C_{10}F_{21}$

E-26: $CH_2=CHCOOCH_2(CF_2)2H$

E-27: $CH_2=C(CH_3)COOCH_2(CF_2)_2H$

E-28: $CH_2=CHCOOCH_2(CF_2)_4H$

E-29: $CH_2=CHCOOCH_2CF_3$

E-30: $CH_2=C(CH_3)COO(CF_2)_4H$

E-31: $CH_2=CHCOOCH_2(CF_2)_6H$

E-32: $CH_2=C(CH_3)COOCH_2(CF_2)_6H$

E-33: $CH_2=CHCOOCH_2(CF_2)_8H$

E-34: $CH_2=C(CH_3)COOCH_2(CF_2)_8H$

E-35: $CH_2=CHCOOCH_2(CF_2)_{10}H$

E-36: $CH_2=CHCOOCH_2(CF_2)_{12}H$

E-37: $CH_2=CHCOOCH_2(CF_2)_{14}H$

E-38: $CH_2=CHCOOCH_2(CF_2)_{18}H$

E-39: $CH_2=CHCOOC(CH_3)_2(CF_2)_4H$

E-40: $CH_2=CHCOOCH_2CH_2(CF_2)_7H$

E-41: $CH_2=C(CH_3)COOCH_2CH_2(CF_2)_7H$

E-42: $CH_2=C(CH_3)COOC(CH_3)_2(CF_2)^6H$

E-43: $CH_2=CHCOOCH(CF_3)C_8F_{17}$

E-44: $CH_2=CHCOOCH_2C_2F_5$

E-45: $CH_2=CHCOO(CH_2)_2(CF_2)_8CF(CF_3)_2$

When the fluorine-containing (meth)acrylate (E) is used in the composition of the present invention, it is possible to decrease the refractive index of a cured product obtained from the composition. Furthermore, when a fluorine-containing polymer (F) described below is included in the composition, it becomes easy to adjust the viscosity of a mixture to a viscosity wherein good coatability, mold operational ability and the like can be achieved without reducing the light permeability of the cured product.

The fluorine-containing polymer (F) can also be used to maintain the transparency of the photocurable composition, improvements of the mechanical strength and the low refractive-index property of a cured product and the like. Examples of the fluorine-containing polymer (F) include a homopolymer of a fluorine-containing (meth)acrylate (E) and a copolymer which is generated from a fluorine-containing (meth)acrylate (E) and one of or two or more kinds of non-fluorine-containing (meth)acrylates (C).

When the polymer (F) is used in the present invention, the manufacturing method thereof is not restricted at all. Examples of the manufacturing method thereof include; an emulsion polymerization method, a solution-polymerization method and a block polymerization method which are conducted in accordance with polymerization mechanisms such as a radical polymerization method, a cationic polymerization method, an anionic polymerization method and the like, and heat, light, electron ray, radiation and the like can be used as energy for starting a polymerization. The radical polymerization method which uses heat and/or light as an initiating energy is desirable from the viewpoint of industrial availability.

When heat is used as an initiating energy for a polymerization, heat can be used without a catalyst or be used with various heat polymerization initiators without restrictions. Examples of the initiator include: peroxides such as benzoyl peroxide and diacyl peroxide; azo compounds such as azobisisobutyronitrile and phenylazotriphenylmethane; and metal chelate compounds such as $Mn(acac)_3$. Furthermore, when light such as ultraviolet ray is used, a photopolymerization initiator (for example, the aforementioned compounds B-1 to B-9) can be used Moreover, it is also possible to accelerate the polymerization by adding a photosensitizer such as an amine compound and a phosphorus compound, if required. When a polymer is produced with electron ray or radiation, it is not necessary to add a polymerization initiator.

When radical polymerization is conducted, it is possible to control a molecular weight of a polymer by selecting and using various chain transfer agents in combination, if required. Examples of the chain transfer agent include compounds such as lauryl mercaptan, 2-mercaptethanol, ethyl thioglycolic acid, octyl thioglycolic acid, and γ-mercaptopropyl trimethoxy silane.

There is no restriction on a solvent used in the solution polymerization in particular. Examples of the solvent include: alcohols such as ethanol, isopropyl alcohol, n-butanol, isobutanol, and tert-butanol; ketones such as acetone, MEK, MIBK, and methyl amyl ketone; esters such as methyl acetate, ethyl acetate, butyl acetate, methyl lactate, ethyl lactate and butyl lactate; monocarboxylate such as 2-oxy methyl propionate, 2-oxy ethyl propionate, 2-oxy propyl propionate, 2-oxy butyl propionate, 2-methoxy methyl propionate, 2-methoxy ethyl propionate, 2-methoxy propyl propionate and 2-methoxy butyl propionate; polar solvents such as dimethyl formamide, dimethyl sulfoxide and N-methyl pyrrolidone; ethers such as a methyl cellosolve, cellosolve, butyl cellosolve, butyl carbitol, and ethyl cellosolve acetate; propylene glycols and esters thereof such as propylene glycol, propylene glycol monomethyl ether, propylene glycol monomethyl ether acetate, propylene glycol monoethyl ether acetate, and propylene glycol monobutyl ether acetate; halogenated hydrocarbons such as 1,1,1-trichloroethane and chloroform; ethers such as tetrahydrofuran and dioxane; aromatic hydrocarbons such as benzene, toluene, and xylene; and fluorinated inert liquids such as perfluorooctane, and perfluorotri-n-butyl amine.

Moreover, when a copolymer is used as the fluorine-containing polymer (F), the sequence of the copolymer such as block, alternative, and random can be determined by the combination of a monomer used. Furthermore, it is possible to preferably control the sequences by selecting a polymerization mechanism, an initiator, a chain transfer agent, and the like. In any case, it can be used suitably for the present invention. Furthermore, it is possible to use a polymer such as a homopolymer and a copolymer singly or in combination of two or more simultaneously.

There are also no particular restrictions on a molecular weight and a molecular weight distribution of the fluorine-containing polymer (F). The molecular weight of the polymer (F) can be selected in accordance with conditions such as an aimed mechanical strength of an optical medium, viscosity of the composition, and processing conditions of the composition at the time of producing an optical medium, and the like. The molecular weight of the polymer (F) is 2000 to 3000000 in general, and is preferably 5000 to 2000000. Furthermore, it is also possible to blend two or more kinds of polymers which have a different molecular weight to each other to prepare a composition, from the viewpoint of suitable viscosity, operational ability at the time of producing an optical medium, achievement of mechanical characteristics of an optical medium and the like.

The photocurable composition obtained in the present invention can be polymerized and cured to produce a cured product by irradiating light after conducting a forming operation such as an application, impregnation and the like, under the conditions such that the cured product obtained from the composition can satisfy the aimed use thereof. Moreover, it is also possible to use heat as an energy source in combination with light as required. In this case, it is possible to use a polymerization initiator such as an azobisisobutyronitrile, benzoin peroxide, and methyl ethyl ketone peroxide, and cobalt naphthenate for the composition.

A light source used in the photopolymerization is not restricted in particular. Examples of the light source include; a germicidal lamp, a fluorescent lamp which emits ultraviolet ray, a carbon arc lamp, a xenon lamp, a high pressure mercury lamp used for a copy, a middle-pressure mercury-vapor lamp, a high-pressure mercury-vapor lamp, an extra-high pressure mercury lamp, an electrodeless lamp, a metal halide lamp, ultraviolet ray wherein natural light is used as a light source, and an electron beam provided by a scanning or curtain type electron accelerator. When curing of a coating layer or the like, which has a thickness of 5 μm is conducted using ultraviolet ray, it is preferable that exposure is conducted under an inert gas atmosphere such as nitrogen gas from the viewpoint of the polymerization efficiency.

The use of the fluorine-containing photocurable composition obtained in the present invention is not particularly limited. The fluorine-containing photocurable composition can be suitably used as an optical material, a coating material and the like. For example, the composition can be used for a sealing material used for LED, a coating agent used for glass, plastics, antireflection coating, and optical waveguide, and a clading material used for an optical fiber, optical lens and the like. Furthermore, it is also possible to improve optical characteristics, surface characteristics and the like of a cured product prepared by the composition, for example, by selecting suitable composition(s) from various another photocurable compositions and mixing them with the fluorine-containing photocurable composition of the present invention, or by selecting suitable agent(s) from various surface active agents, a surface reforming agent and the like and mixing them with the fluorine-containing photocurable composition of the present invention.

The fluorine-containing photocurable composition of the present invention can form a cured product due to an optical curing. While excellent optical characteristics such as a low refractive index, mechanical characteristics such as dimensional stability and strength and surface characteristics originating from a fluorine atom can be achieved by the cured product obtained from the composition, the obtained cured product is hardly subject to chemical degradation such as hydrolysis, and therefore the cured product has excellent moist heat resistance, and the aforementioned characteristics can be maintained for a long period of time.

EXAMPLES

Hereinafter, examples are described in detail in order to explain the present invention, but the present invention is not at all restricted to only the examples. In the following examples, "%" means "% by weight" unless otherwise stated.

Synthetic Example 1

Synthesis of Acrylate Containing a Fluorinated Alkyl Group

Average Number of an Additional Functional Group of the Acrylate: 1

33.5 g of trimethylol propane, 123.0 g of 3-perfluorooctyl propionic acid (manufactured by Tosoh F-Tech, Inc.), 50 g of toluene and 50 g of cyclohexane were placed into a 500 ml four-neck flask equipped with a dean-stark apparatus, and then 2.5 g of sulfuric acid was added thereto and then azeotropic dehydration was conducted for 12 hours. After generation of 4.5 g of water was confirmed, the mixture was once cooled at 25° C., and 45.0 g of acrylic acid and 0.4 g of hydroquinone were added thereto, and azeotropic dehydration was further conducted while air was blown into the flask. After generation of 9.0 g of water was confirmed, the mixture was cooled at 25° C. 150 g of toluene was added to the obtained reaction liquid, and then neutralization washing was conducted with 30 g of 25% aqueous solution of sodium hydroxide, and washing was further conduced three times with 40 g of 20% salt solution. After toluene and cyclohexane were removed under reduced pressure, 170 g of light yellow liquid was obtained. This liquid was dissolved in 150 ml of toluene, and refining was conducted by silica gel chromatography. Subsequently, toluene was removed under reduced pressure while oxygen was blown thereto and the temperature of a water bath used was maintained at 50° C. to obtain a fluorinated alkyl group-containing acrylate (A-1) represented by the general formula (ii). The peaks and integration values of 1 H-NMR spectrum of the obtained product showed that the target compound was synthesized.

$^1$H-NMR:

d 0.85 (t, J=7.0 Hz, 3H), 1.30-1.60 (m, 2H), 2.20-2.50 (m, 2H), 2.40-3.00 (m, 2H), 5.80 (d, J=10.2 Hz, 2H), 6.0 (dd, J=10.2, 17.3 Hz, 2H), 6.45 (d, J=17.3 Hz, 2H)

Synthetic Example 2

Synthesis of Acrylate Containing a Fluorinated Alkyl Group

Average Number of an Additional Functional Group of the Acrylate: 1

Synthesis of Mercaptosuccinic Acid Diester 150.0 g of perfluorohexyl ethyl mercaptan, 30.0 g of thiomalic acid, 1.5 g of sulfuric acid and 200 ml of toluene were placed into a 500 ml flask equipped with a Dean-stark apparatus, and then heating reflux was conducted until the theoretical amount of water (7.1 g) was removed. Subsequently, 20 g of slaked lime was added to the mixture after the mixture was cooled at 60° C., and the mixture was stirred for 30 minutes at the same temperature. Then, filtration was conducted and toluene was removed under reduced pressure to obtain 168.0 g of thiomalic add di-(perfluorohexyl ethyl ester) as a viscous liquid which was yellow and transparent.

Synthesis of Acrylate Containing a Fluorinated Alkyl Group 17.6 g (0.05 moles) of pentaerythritol tetraacrylate (ARONIX M-450, manufactured by Toagosei Co., Ltd.), 43.7 g (0.05 moles) of thiomalic acid di-(perfluorohexyl ethyl ester), 10 g of ethyl acetate were placed into a 200 ml reaction flask, and 1.0 g of triethylamine was gradually added thereto while stirring was conducted at 50° C. After addition of the triethylamine was completed, the mixture was further stirred at 50° C. for 3 hours. After the reaction was completed, ethyl acetate and triethylamine were removed under reduced pressure at the temperature of 50° C. or less. Then, drying was conducted with a vacuum pump to obtain 25.0 g of fluorinated alkyl group-containing acrylate (A-2) represented by the aforementioned general formula (v), The peaks and integration values of 1 H-NMR spectrum of the obtained product showed that the target compound was synthesized.

$^1$H-NMR:

δ

2.05-2.20 (m, 2H)

2.30-2.90 (m, 12H), 3.90-4.30 (m, 9H), 5.80 (d, J=10.2 Hz, 3H), 6.0 (dd, J=10.2, 17.3 Hz, 3H), 6.45 (d, J=17.3 Hz, 3H)

Synthetic Example 3

Synthesis of Acrylate Containing a Fluorinated Alkyl Group

Average Number of an Additional Functional Group of the Acrylate: 1

67.0 g (0.20 moles) of trimethylol propane trimethacrylate (NK ESTER TMTP, manufactured by Shin-nakamura Chemical Corporation), 56.0 g (0.20 moles) of perfluorobutyl ethyl mercaptan were placed into a 200 ml reaction flask, and then 2 g of triethylamine was gradually added into while stirring. Reaction temperature rose to 35° C. After the addition was completed, the mixture was further stirred at 50° C. for 3 hours. After stirring was completed, triethylamine was removed under reduced pressure while oxygen was blown thereto while the water bath temperature was maintained at 50° C. or less. Then, by further conducting drying with a vacuum pump, 120 g of fluorinated alkyl group-containing methacrylate (A-3) was obtained wherein the methacrylate had a similar to the structure (vii), except that an acryloyl group was a methacryloyl group and a methyl group was bonded to the carbon atom adjacent to a carbonyl group. The peaks and integration values of 1 H-NMR spectrum of the obtained product showed that the target compound was synthesized.

$^1$H-NMR:

δ

0.87 (t, J=7.0 Hz, 3H)

1.25 (d, J=7.2 Hz, 3H)

1.31-1.60 (m, 2H)

2.22-2.52 (m, 1H)

2.43-3.00 (m, 6H)

4.20-14.40 (m, 6H)

5.85 (d, J=10.2 Hz, 2H)

6.1 (dd, J=10.2, 17.3 Hz, 2H)

6.45 (d, J=17.3 Hz, 2H)

Synthetic Example 4

Synthesis of Acrylate Containing a Fluorinated Alkyl Group

Average Number of an Additional Functional Group of the Acrylate: 1

59.7 g (0.20 moles) of pentaerythritol triacrylate (LUMICURE PEA-300, manufactured by Dainippon Ink and Chemicals Incorporated) and 101 g (0.20 moles) of N-propyl-perfluorooctyl ethyl amine were placed into a 200 ml reaction flask, and stirred to be mixed uniformly while maintaining the flask in a warm water bath. 2 g of triethylamine was added to the mixture gradually, and then the mixture was further stirred for 3 hours at the temperature of 50° C. After the reaction was completed, triethylamine was removed under reduced pressure with an evaporator at the temperature of 50° C. or less, and then drying was further conducted with a vacuum pump to obtain 160 g of fluorinated alkyl group containing acrylate (A-4) represented by the general formula (viii). The peaks and integration values of 1 H-NMR spectrum of the obtained product showed that the target compound was synthesized.

$^1$H-NMR:

δ

2.20-2.50 (m, 2H), 2.50-2.90 (m, 6H), 3.30-3.60 (m, 2H), 4.10-4.30 (m, 6H), 5.86 (d, J=10.3 Hz, 2H), 6.10 (dd, J=10.3, 17.3 Hz, 2H), 6.40 (d, J=17.3 Hz, 2H)

Synthetic Example 5

Synthesis of Acrylate Containing a Fluorinated Alkyl Group

Average Number of an Additional Functional Group of the Acrylate: 1

149.5 g of fluorinated alkyl group-containing acrylate (A-5) was obtained similar to the Synthetic Example 3, except that 95.8 g (0.20 moles) of perfluorooctyl mercaptan was used instead of 56.0 g (0.20 moles) of perfluorobutyl ethyl mercaptan. The peaks and integration values of 1 H-NMR spectrum of the obtained product showed that the target compound was synthesized.

$^1$H-NMR:

δ

0.85 (t, J=7.0 Hz, 3H), 1.30-1.60 (m, 2H), 2.20-2.50 (m, 2H), 2.40-3.00 (m, 6H), 4.15-4.40 (m, 6H), 5.80 (d, J=10.2 Hz, 2H), 6.0 (dd, J=10.2, 17.3 Hz, 2H), 6.45 (d, J=17.3 Hz, 2H)

Synthetic Example 6

Synthesis of Acrylate Containing a Fluorinated Alkyl Group

Average Number of an Additional Functional Group of the Acrylate: 1

96.0 g (0.20 moles) of perfluorooctyl ethyl mercaptan was dropped into a mite of 85.6 g (0.20 moles) of EO denaturated trimethylolpropane triacrylate (ETA-300, manufactured by Dainippon Ink and Chemicals Incorporated), 3.0 g of triethylamine and 50 g of ethyl acetate included in a 300 ml reaction flask under room temperature. Reaction temperature rose to 35° C. After dropwise addition was completed, stirring was conducted for 3 hours at 50° C. Then, ethyl acetate and triethylamine were removed under reduced pressure while oxygen was blown thereto while a temperature of a water bath was maintained at 50° C. or less. Then, drying was conducted with a vacuum pump, and 171.2 g of a fluorinated alkyl group-containing acrylate (A-6) represented by the general formula (xii) was obtained. The peaks and integration values of 1 H-NMR spectrum of the obtained product showed that the target compound was synthesized.

$^1$H-NMR:

δ

0.89 (t, J=7.0 Hz, 3H)

1.30-1.60 (m, 2H)

2.22-3.00 (m, 8H)

3.10-4.20 (m, 18H)

5.85 (d, J=10.1 Hz, 2H)

6.10 (dd, J=10.1, 17.3 Hz, 2H)

6.40 (d, J=17.3 Hz, 2H)

Synthetic Example 7

Synthesis of Acrylate Containing a Fluorinated Alkyl Group

Average Number of an Additional Functional Group of the Acrylate: 1

10.6 g (0.03 moles) of the pentaerythritol tetraacrylate, 2 g of triethylamine and 10 g of ethyl acetate was placed in a 200 ml reaction flask, and 14.4 g (0.03 moles) of perfluorooctyl ethyl mercaptan was gradually added thereto while stirring was conducted. Reaction temperature rose to 35° C. After the addition was completed, stirring was further conducted for 3 hours at the temperature of 50° C. Then, 60 g of ethyl acetate was added thereto and mixed uniformly, and an organic layer thereof was washed with 100 ml of 1 N hydrochloric acid. The organic layer was further washed with 100 ml of water twice, and the organic layer was separated. Furthermore, reaction solvent was removed from the separated solution under reduced pressure with an evaporator at the temperature of 50° C. or less, and then drying was conducted with a vacuum pump to obtain 25.0 g of a fluorinated alkyl group-containing acrylate (A-7) represented by the general formula (xiv). The peaks and integration values of 1 H-NMR spectrum of the obtained product showed that the target compound was synthesized.

$^1$H-NMR:

δ

2.20-2.90 (m, 8H), 3.95-4.20 (m, 8H), 5.80 (d, J=10.0 Hz, 2H), 6.00 (dd, J=10.0, 17.0 Hz, 2H), 6.45 (d, J=17.0 Hz, 2H)

Synthetic Example 8

Synthesis of Acrylate Containing a Fluorinated Alkyl Group

Average Number of an Additional Functional Group of the Acrylate: 1

25.0 g of fluorinated alkyl group-containing acrylate (A-8) represented by the general formula (xvi) was obtained similar to the synthetic example 7, except that 13.95 g (0.03 moles) of ditrimethylolpropane tetraacrylate (NK ESTER AD-TMP, manufactured by Shin-nakamura Chemical Corporation) was used instead of 10.6 g (0.03 moles) of pentaerythritol tetraacrylate, and 11.4 g (0.03 moles) of perfluorohexyl ethyl mercaptan was used instead of 14.4 g (0.03 moles) of perfluorooctyl ethyl mercaptan. The peaks and integration values of 1 H-NMR spectrum of the obtained product showed that the target compound was synthesized.

$^1$H-NMR:

δ

0.85 (t, J=7.0 Hz, 3H), 1.30-1.60 (m, 2H), 2.20-2.50 (m, 2H), 2.40-3.00 (m, 6H), 4.15-4.40 (m, 6H), 5.80 (d, J=10.2 Hz, 2H), 6.0 (dd, J=10.2, 17.3 Hz, 2H), 6.45 (d, J=17.3 Hz, 2H)

Synthetic Example 9

Synthesis of Acrylate Containing a Fluorinated Alkyl Group

Average Number of an Additional Functional Group of the Acrylate: 2

42.0 g of a product (A-9), which was a mixture including fluorinated alkyl group-containing acrylate represented by the general formula (xvii) and a compound(s) wherein the position at which addition reaction between an acryloyl group and perfluorooctyl ethyl mercaptan occurred was different from those of the general formula (xvii), was obtained similar to the synthetic example 8, except that 28.8 g (0.06 moles) of perfluorooctyl ethyl mercaptan was used instead of 11.4 g (0.03 moles) of perfluorohexyl ethyl mercaptan. The peaks and integration values of 1 H-NMR spectrum of the obtained product showed that the target compound was synthesized.

$^1$H-NMR:

δ

0.85 (t, J=7.0 Hz, 6H), 1.45 (J=7.0 Hz, 4H), 2.30-2.80 (m, 16H), 3.20-3.40 (m, 4H), 3.95-4.20 (m, 8H), 5.80 (d, J=10.2 Hz, 2H), 6.00 (dd, J=10.2, 17.3 Hz, 2H), 6.45 (d, J=17.3 Hz, 2H)

Synthetic Example 10

Synthesis of Acrylate Containing a Fluorinated Alkyl Group

Average Number of an Additional Functional Group of the Acrylate: 2

44.0 g of a product (A-10), which was a mixture including a fluorinated alkyl group-containing acrylate represented by the general formula (xviii) and a compound(s) wherein a position at which addition reaction between an acryloyl group and perfluorooctyl ethyl mercaptan occurred was different from those of the general formula (xviii), was obtained similar to the synthetic example 7, except that 15.7 g (0.03 moles) of dipentaerythritol hydroxy pentaacrylate was used instead of 10.6 g (0.03 moles) of the pentaerythritol tetraacrylate, and 28.8 g (0.06 moles) of perfluorooctyl ethyl mercaptan was used instead of 14.4 g (0.03 moles) of perfluorooctyl ethyl mercaptan. The peaks and integration values of 1 H-NMR spectrum of the obtained product showed that the target compound was synthesized.

$^1$H-NMR:

δ

2.10-2.90 (m, 16H), 3.20-3.45 (m, 4H), 3.75-4.20 (m, 12H), 5.85 (d, J=10.2 Hz, 3H), 6.10 (dd, J=10.2, 17.0 Hz, 3H), 6.45 (d, J=17.0 Hz, 3H)

Synthetic Example 11

Synthesis of Acrylate Containing a Fluorinated Alkyl Group

Average Number of an Additional Functional Group of the Acrylate: 2

26.2 g (0.05 moles) of dipentaerythritol hydroxy pentaacrylate (SR-399E, manufactured by Kayaku Sartomer Company Inc), 19.1 g (0.05 moles) of perfluorohexyl ethyl mercaptan and 24.1 g (0.05 moles) of perfluorooctyl ethyl mercaptan were placed into a 200 ml reaction flask, and then 1.0 g of triethylamine was gradually added thereto while stirring was conducted. After the addition was completed, stirring was further conducted for 3 hours at 50° C. Then, triethylamine was removed from the mixture under reduced pressure with an evaporator (the temperature of bath was 50° C. or less) to obtain 69.4 g of a product (A-11), which was a mixture including a fluorinated alkyl group-containing acrylate represented by the general formula (xix) and a compound(s) wherein a position at which addition reaction between an acryloyl group and perfluorohexyl ethyl mercaptan or perfluorooctyl ethyl mercaptan occurred was different from those of the general formula (xix). The peaks and integration values of 1 H-NMR spectrum of the obtained product showed that the target compound was synthesized.

$^1$H-NMR:

δ

2.20-2.50 (m, 4H), 2.50-2.90 (m, 12H), 3.30-3.60 (m, 2H), 3.60-3.80 (m, 4H), 4.10-4.30 (m, 10H), 5.86 (d, J=10.3 Hz, 6H), 6.10 (dd, J=10.3, 17.3 H 6H), 6.40 (d, J=17.3 Hz, 6H)

Synthetic Example 12

Synthesis of Acrylate Containing a Fluorinated Alkyl Group

Average Number of an Additional Functional Group of the Acrylate: 2

28.9 g (0.05 moles) of dipentaerythritol hexaacrylate (LUMICURE DPA-600, manufactured by Dainippon Ink and Chemicals Incorporated), 1.0 g of triethylamine and 20 g of methyl isobutyl ketone (MIBK) were placed in a 200 ml reaction flask and mixing was conducted, and then 48.2 g (0.1 moles) of perfluorooctyl ethyl mercaptan was added dropwisely while stirring was conducted at a room temperature. After the dropwise addition was completed, stirring was further conducted for 3 hours at 50° C., and MIBK and triethylamine were removed under reduced pressure with an evaporator (the temperature of a bath was 50° C. or less) to obtain 76.8 g of a product (A-12), which was a mixture including a fluorinated alkyl group-containing acrylate represented by the general formula (xxi) and a compound(s) wherein a position at which addition reaction between an acryloyl group and perfluorooctyl ethyl mercaptan occurred was different from those of the general formula (xxi). The peaks and integration values of 1 H-NMR spectrum of the obtained product showed that the target compound was synthesized.

¹H-NMR:

δ

2.20-2.90 (m, 16H), 3.30-3.50 (m, 4H), 4.10-4.40 (m, 12H), 5.84 (d, J=10.2 Hz, 4H), 6.10 (dd, J=10.2, 17.2 Hz, 4H), 6.42 (d, J=17.2 Hz, 4H)

Synthetic Example 13

Synthesis of a Urethane Acrylate Containing a Fluorinated Alkyl Group

Average Number of an Additional Functional Group of the Acrylate: 3

A solution containing 50 ml of MIBK and 59.6 g (0.20 moles) of pentaerythritol triacrylate was added dropwisely to a solution containing 100 ml of MIBK and 22.2 g (0.1 moles) of isophorone diisocyanate included in a 500 ml flask at the temperature of 25° C., while air bubbling was conducted. After the dropwise addition was completed, 0.3 g of dibutyltin dilaurate was added to the mixture, and heating and stirring were conducted for 4 hours at the temperature of 70° C. After the reaction was completed, the obtained reaction solution was washed with 100 ml of 5% hydrochloric acid. Then, an organic layer was separated, and then solvent was removed under reduced pressure at the temperature of 40° C., or less to obtain 80.5 g of urethane acrylate which was a transparent and colorless viscous liquid.

40.8 g (0.05 mols) of the urethane acrylate produced as described above, 71.9 g (0.15 moles) of perfluorooctyl ethyl mercaptan and 60 g of MIBK were placed in a 200 ml reaction flask and mixed uniformly. Furthermore, 1.0 g of triethylamine was gradually added to this mixture at the temperature of 25° C. After the addition was completed, stirring was further conducted for 3 hours at 50° C. Then, triethylamine was removed under reduced pressure with an evaporator at the temperature of 50° C. or less, and then drying was conducted with a vacuum pump to obtain a product (A-13), which was a mixture including a fluorinated alkyl group-containing acrylate represented by the general formula (xxiv) and a compound(s) wherein the position at which addition reaction between an acryloyl group and perfluorooctyl ethyl mercaptan occurred was different from those of the general formula (xxi). The peaks and integration values of 1 H-NMR spectrum of the obtained product showed that the target compound was synthesized.

¹H-NMR:

δ

0.80-1.20 (m, 9H)

1.30-1.50 (m, 6H)

2.0-3.0 (m, 24H)

3.15-3.55 (m, 16H)

5.5 (brs, 2H)

5.85 (d, J=10.2 Hz, 3H), 6.1 (dd, J=10.2, 17.3 Hz, 3H), 6.35 (d, J=17.3 Hz, 3H)

Synthetic Example 14

Synthesis of Acrylate Containing a Fluorinated Alkyl Group

Average Number of an Additional Functional Group of the Acrylate: 4

A solution containing 50 ml of MIBK and 88.0 g (0.06 moles) of fluorinated acrylate obtained in the Example 10 was added dropwisely to a mixture including 100 ml of MIBK and 7.86 g (0.03 moles) of hydrogenated 4,4-diphenylmethane diisocyanate included in a 500 ml reaction flask at the temperature of 25° C. After the dropwise addition was completed, 0.3 g of dibutyltin dilaurate was added to the mixture, and heating and stirring were performed for 4 hours at the temperature of 55° C. After the reaction was completed, the reaction solution was washed with 100 ml of 5% hydrochloric acid. Then, an organic layer thereof was separated from the solution, and solvent was removed under the reduced pressure at the temperature of 40° C. or less to obtain 91.4 g of a product (A-14), which was a mixture including a wax-like fluorinated alkyl group-containing acrylate represented by the general formula (xxv) and a compound(s) wherein the position at which addition reaction between an acryloyl group and perfluorooctyl ethyl mercaptan occurred was different from those of the general formula (xxv). Generation of the target product was able to be confirmed from the integration ratio of vinyl proton (—OCOCH=CH₂) and carbon bonding to ether (C—CH₂—O—CH₂—C) of the product evaluated in 1H-NMR and the results of the FT-IR spectrum.

¹H-NMR:

δ

Hydrogen of vinyl group 5.85 (d, J=10.2 Hz, 6H), 6.1 (dd, J=10.2, 17.3 Hz, 6H), 6.35 (d, J=17.3 Hz, 6H)

Hydrogen bonded to a carbon atom of an ether bond 3.20-3.45 (m, 8H)

FT-IR (cm⁻¹); 3370, 1730, 1520, 1200

Synthetic Example 15

Synthesis of Acrylate Containing a Fluorinated Alkyl Group

Average Number of an Additional Functional Group of the Acrylate: 1

21.2 g (0.05 moles) of tris(acryloxyethyl)isocyanurate (ARONIX M-315, manufactured by Toagosei Co., Ltd.), 1.0 g of triethylamine and 15 g of ethyl acetate were mixed in a 200 ml reaction flask, and 19.0 g (0.05 moles) of perfluorohexyl ethyl mercaptan was added dropwisely at room temperature while stirring was conducted (the reaction temperature rose to 35° C.). After the addition was completed, stirring was further conducted for 3 hours at 50° C., and triethylamine and ethyl acetate were removed under reduced pressure at the temperature of 50° C. or less to obtain 39.4 g of acrylate containing a fluorinated alkyl group (A-15) represented by the general formula (xxvi). The peaks and integration values of 1 H-NMR spectrum of the obtained product showed that the target compound was synthesized.

$^1$H-NMR:

δ

2.22-2.52 (m, 2H)

2.43-3.00 (m, 6H)

4.25-4.40 (m, 6H)

5.80 (d, J=10.0 Hz, 2H)

6.05 (dd, J=10.0, 17.2 Hz, 2H)

6.32 (d, J=17.2 Hz, 2H)

Synthetic Example 16

Synthesis of Acrylate Containing a Fluorinated Alkyl Group

Average Number of an Additional Functional Group of the Acrylate: 1

40.0 g of fluorinated alkyl group-containing acrylate (A-16) represented by the general formula (xxx) was obtained similar to the Synthetic Example 15, except that 15.1 g (0.05 moles) of EO denatured phosphoric acid triacrylate was used instead of 21.2 g (0.05 moles) of tris(acryloxyethyl) isocyanurate (ARONIX M-315, manufactured by Toagosei Co., Ltd.), and 24.0 g (0.05 moles) of perfluorooctyl ethyl mercaptan was used instead of 19.0 g (0.05 moles) of perfluorohexyl ethyl mercaptan. The peaks and integration values of 1 H-NMR spectrum of the obtained product showed that the target compound was synthesized.

$^1$H-NMR:

δ

2.30-2.52 (m, 2H)

2.43-3.00 (m, 6H)

4.10-4.30 (m, 6H)

4.30-4.45 (m, 6H)

5.82 (d, J=10.0 Hz, 2H)

6.05 (dd, J=10.0, 17.2 Hz, 2H)

6.30 (d, J=17.2 Hz, 2H)

Synthetic Example 17

Synthesis of a Fluorine-Containing Polymer 60.0 g of $CH_2$=$CHCOOCH_2CH_2C_8F_{17}$, 23.0 g of dicyclopentanyl acrylate, 12.0 g of isobornyl acrylate, 1.0 g of dicyclopentenyl acrylate and 0.15 g of B-9 (2-hydroxy-2-methyl-1-phenyl propane-1-one) were added into a 500 ml glass cylinder flask equipped with a stirrer and a thermometer. Then, under a nitrogen flow, irradiation with one high-pressure mercury-vapor lamp of 80 W/cm was conducted from the side of the flask until the temperature of the mixture increased 8° C. due to exothermic reaction provided by the irradiation. Then, a fluorine-containing acryl polymer (F-1) was obtained. The acryl polymer was a transparent and colorless viscous liquid. The gel content ratio of the liquid (the amount of precipitation of the liquid in methanol which was 10 times larger than the liquid) was 7.0%.

Comparative Synthetic Example 1

Synthesis of Fluorine-Containing Polyfunctional Acrylate Described in Example 2 of Patent Document 1

33.5 g of trimethylol propane, 103.5 g of perfluorooctanoic acid, 50 g of toluene and 50 g of cyclohexane were placed in a 500 ml four-neck flask equipped with a water separating column, and then 2.5 g of concentrated sulfuric acid was added thereto, and azeotropic dehydration was conducted for 12 hours. The mixture was once cooled at 25° C., after generation of 4.5 g of water was confirmed, and 44.5 g of acrylic acid and 0.4 g of hydroquinone were added to the mixture. Then, azeotropic dehydration was further conducted while air was blown into the flask.

After generation of 9.0 g of water was confirmed, it was cooled at 25° C. Then, 150 g of toluene was added to the reaction liquid, and neutralization washing was conducted with 30 g of 20% aqueous solution of sodium hydroxide, and furthermore, washing was conducted with 40 g of saline solution three times. Then, toluene and cyclohexane were removed under reduced pressure to obtain 91 g of a pale yellow liquid. The yellow liquid was dissolved in 150 ml of toluene, and purification was conducted by gel chromatography. Subsequently, toluene was removed under reduced pressure while oxygen was blown thereto and the water bath temperature was maintained at 50° C. or less to obtain a fluorine-containing polyfunctional acrylate (A'-1), which was represented by a following general formula, of Example 2 of patent document 1. The peaks and integration values of 1 H-NMR spectrum of the obtained product show that target compound was synthesized.

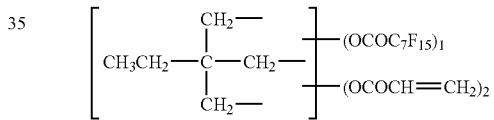

$^1$H-NMR:

δ

0.85 (t, J=7.0 Hz, 3H), 1.30-1.60 (m, 2H), 4.15-4.40 (m, 6H), 5.80 (d, J=10.2 Hz, 3H), 6.0 (dd, J=10.2, 17.3 Hz, 3H), 6.45 (d, J=17.3Hz, 3H)

Comparative Synthetic Example 2

Synthesis of Polyfunctional Urethane Acrylate Containing Fluorine of Example 1 of Patent Document 2

7.5 g of isophorone diisocyanate, 7.4 g of 3-(2-perfluorohexyl)ethoxy-1,2-dihydroxy propane and 30 g of methyl isobutyl ketone were placed in this order in a 200 ml flask equipped with a cooling device and a thermometer, and then stirred at the temperature of 25° C. After being stirred for 2 hours, 0.05 g of dibutyltin dilaurate was added to the mixer, and stirring was conducted at the temperature of 50° C. Then, 0.04 g of dibutyltin dilaurate and a mixed solution of 16.5 g of pentaerythritol triacryrate and 58 g of isobutyl ketone were added to the mixture, and stirred for 4 hours at the temperature of 64 to 66° C. After the reaction was completed, solvents were removed under reduced pressure with an evaporator to obtain fluorine-containing polyfunctional urethane acrylate (A'-2) represented by the following general formula. The FT-IR spectrum of the obtained fluorine-containing polyfunctional urethane acrylate showed that absorption similar to those of patent document 2 was confirmed, and the target product was synthesized.

was dissolved in 20 ml of chloroform below the freezing temperature, was provided from the dropping funnel dropwisely into the flask so that the temperature of the reaction temperature did not exceed 5° C. After the dropwise addition was completed, stirring was maintained for two hours while cooling was conducted with ice, and then, solvent was removed under reduced pressure to obtain a product (A'-3) of patent document 4 represented by the following general formula.

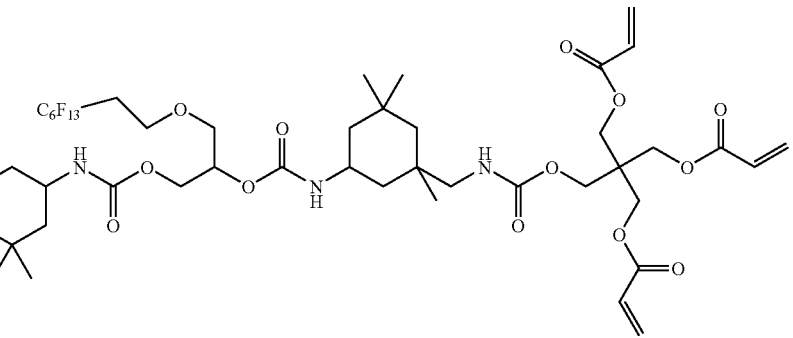

FT-IR(cm$^{-1}$): 3370, 1730, 1520, 1200

Comparative Synthetic Example 3

Synthesis of Polyfunctional (meth)acrylate Containing Fluorine of Example 1 of Patent Document 4

0.01 mole of fluorine-containing epoxide (CH$_2$OCHCH$_2$(CF$_2$)$_8$CH$_2$CHOCH$_2$), 0.2 moles of distilled water, 0.001

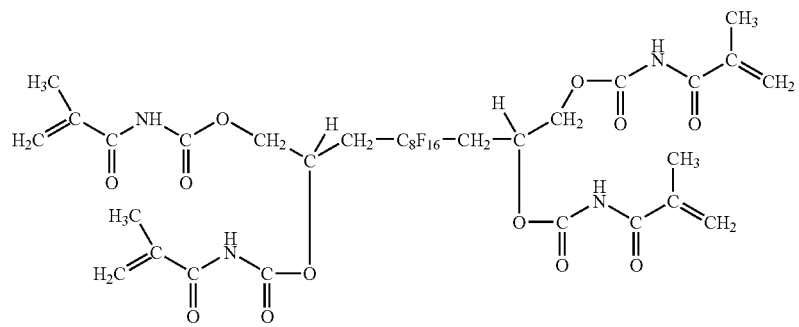

mole of sodium hydroxide and 20 g of tetrahydrofuran as a solvent were placed in a flask equipped with a stirrer, and the mixture was heated at 100° C., using an oil bath for 4 hours so that the hydrolysis reaction was performed. Subsequently, after the solvent was removed, the obtained product was dissolved in diethyl ether, and then washed three times using distilled water to remove the catalyst. Then, after adding magnesium sulfate to the ether layer, it was allowed to stand for 12 hours. After magnesium sulfate was separated by filtration, ether were removed to obtain a product. Subsequently, the product was dissolved in 50 ml of chloroform, and it was placed in a three-neck flask equipped with a stirrer, a thermometer, a dropping funnel and a gas introduction pipe. A solution, wherein 0.04 moles of methacryloyl isocyanate

Comparative Synthetic Example 4

Synthesis of urethane(meth)acrylate Compound of Example 3 of Patent Document 5

1095.5 g of 3-(2-perfluoro-n-hexyl)ethoxy-1,2-epoxy propane, 235.4 g of acrylic acid, 5.5 g of tetramethyl ammonium chloride and 0.5 g of hydroquinone monomethyl ether were placed in a flask, and the mixture obtained was stirred for 18 hours at the temperature of 90 to 95° C. to conduct a reaction. The obtained reaction liquid was dissolved in 2l of toluene, and the mixture was washed two times with a 15% by weight aqueous solution of sodium carbonate, and further washed three times with 20% by weight aqueous solution of sodium chloride. Then, toluene was removed under reduced pressure to obtain a transparent and colorless liquid. Subsequently, 500.3 g of the obtained liquid and 0.3 g of di-n-butyltin dilaurate were placed in a vessel, and 153.7 g of 2-methacryloyloxy ethyl isocyanate was further added thereto gradually. Then, the reaction was conducted for 4 hours at the temperature of 50 to 60° C., to obtain a mixture (A'-4) of products represented by the following general formulae of patent document 5.

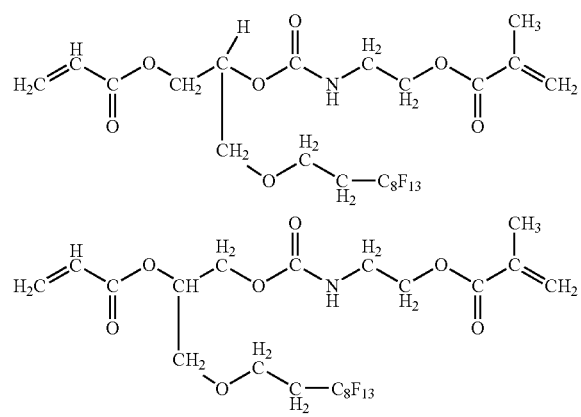

The number of (meth)acryloyl groups, the fluorine content (% by weight), and molecular weight in 1 molecule of the fluorinated alkyl group-containing (meth)acrylates obtained in the Synthetic Examples and the Comparative Synthetic examples are shown in Table 1.

TABLE 1

Characteristics of fluorinated alkyl group-containing (meth)acrylates

| Acrylate | Number of (meth)acryloyl groups | Content of a fluorine atom (%) | Molecular weight |
|---|---|---|---|
| A-1 | 2 | 45.1 | 716 |
| A-2 | 3 | 42.5 | 1162 |
| A-3 | 2 | 27.7 | 618 |
| A-4 | 2 | 37.3 | 867 |
| A-5 | 2 | 41.6 | 776 |
| A-6 | 2 | 35.8 | 908 |
| A-7 | 3 | 38.8 | 832 |
| A-8 | 3 | 29.2 | 846 |
| A-9 | 2 | 45.3 | 1426 |
| A-10 | 3 | 43.5 | 1484 |
| A-11 | 3 | 41.2 | 1384 |
| A-12 | 4 | 42.0 | 1538 |
| A-13 | 3 | 42.9 | 2259 |
| A-14 | 6 | 40.1 | 3220 |
| A-15 | 2 | 30.8 | 803 |
| A-16 | 2 | 39.2 | 824 |
| A'-1 | 2 | 44.7 | 638 |
| A'-2 | 6 | 16.6 | 1490 |
| A'-3 | 4 | 30.6 | 994 |
| A'-4 | 2 | 38.2 | 647 |

Examples 1-17 and Comparative Examples 1-7

Fluorine-containing photocurable compositions were prepared by mixing compounds uniformly in accordance with the compounding ratio shown in Table 2. The compositions were prepared by combining: fluorinated alkyl group-containing (meth)acrylates (A-1) to (A-16) and the comparative compounds (A'-1) to (A'-4) which were synthesized according to the aforementioned synthetic examples and comparative synthetic examples; photopolymerization initiator B-9 (2-hydroxy-2-methyl-1-phenyl propane-1-one); and other compounding ingredients for compositions used for a coating film test, such as D-17 (trimethylolpropane triacrylate) or D-20 (pentaerythritol tetraacrylate), which was a non-fluorine-containing polyfunctional monomer; or other compounding ingredients used in compositions, which formed a cured product having a thickness of 1 mm or 5 mm, such as D-6 (dipropylene glycol diacrylate) or D-9 (neopentyl glycol diacrylate), which was non-fluorine-containing polyfunctional monomer, E-1 ($CH_2=CHCOOCH_2CH_2C_8F_{17}$), which was a fluorine-containing (meth)acrylate, and a fluorine-containing polymer (F-1) obtained in the Synthetic Example 17. The fluorine content ratio in Table 2 means a content ratio (% by weight) of a fluorine atom in a composition excluding a polymerization initiator.

TABLE 2

Table of compounding ratios of fluorine-containing photocurable compositions

| | | Compounding ratio | Content of a fluorine atom |
|---|---|---|---|
| Examples | 1 A-1/D-17/B-9 = | 25/75/4 | 11.7 |
| | 2 A-2/D-17/B-9 = | 25/75/4 | 10.2 |
| | 3 A-4/D-17/B-9 = | 50/50/4 | 17.9 |
| | 4 A-5/D-20/B-9 = | 40/60/4 | 16.0 |
| | 5 A-7/D-17/B-9 = | 25/75/4 | 9.3 |
| | 6 A-12/D-17/B-9 = | 25/75/4 | 10.1 |
| | 7 A-13/D-17/B-9 = | 15/85/4 | 6.2 |
| | 8 A-15/D-17/B-9 = | 25/85/4 | 7.4 |
| | 9 A-16/D-17/B-9 = | 25/85/4 | 9.4 |
| | 10 A-1/D-9/B-9 = | 70/30/0.4 | 31.6 |
| | 11 A-2/D-9/B-9 = | 70/30/0.4 | 29.8 |
| | 12 A-5/D-9/E-1/B-9 = | 50/20/30/0.4 | 45.1 |
| | 13 A-11/D-9/E-1/B-9 = | 60/30/10/0.4 | 32.8 |
| | 14 A-12/D-9/F-1/B-9 = | 50/20/30/0.4 | 35.6 |
| | 15 A-13/D-6/B-9 = | 70/30/0.4 | 30.0 |
| | 16 A-15/D-6/E-1/B-9 = | 30/40/30/0.4 | 33.5 |
| | 17 A-16/D-9/B-9 = | 70/30/0.4 | 27.4 |
| Comparative Examples | 1 A'-1/D-17/B-9 = | 25/75/4 | 11.7 |
| | 2 A'-2/D-17/B-9 = | 25/75/4 | 4.2 |
| | 3 A'-3/D-17/B-9 = | 25/75/4 | 7.7 |
| | 4 A'-1/D-9/B-9 = | 70/30/0.4 | 31.3 |
| | 5 A'-2/D-9/E-1/B-9 = | 50/20/30/0.4 | 32.6 |
| | 6 A'-3/D-9/B-9 = | 70/30/0.4 | 21.4 |
| | 7 A'-4/D-9/E-1/B-9 = | 50/20/30/0.4 | 43.4 |

Evaluation Examples 1 to 9 and Comparative Evaluation Examples 1 to 3

Each of the fluorine-containing photocurable compositions (Examples 1-9 and Comparative Examples 1 to 3) was coated with an applicator (0.03 mm) on a glass test piece (70 mm×150 mm×2 mm) and cured to form a film due to irradiation by ultraviolet ray (nitrogen atmosphere, a high-pressure mercury-vapor lamp, 120 W, 10 kJ/m$^2$). The following evaluations were performed for the obtained films. Results of the evaluations are shown in Table 3.

<Contact Angle Measurement>

The contact angles of water, diiodomethane, and n-dodecane were measured using an automatic contact angle measurement equipment CA-W150, which was manufactured by Kyowa Interface Science Co., Ltd.

<Pencil Hardness>

Pencil hardness was evaluated by using a pencil hardness tester (MODEL C221A, manufactured by Yoshimitsu Seiki Co., Ltd.).

The wet heat resistance test was conducted as a hydrolysis resistance test. The films obtained above were allowed to stand under the conditions of a temperature of 70° C. and humidity of 98% RH for 500 hours. Subsequently, after moisture on the surface of the film was removed, the films were allowed to stand until the temperature thereof became room temperature (25° C.), and the contact angles of water, diiodomethane and n-dodecane were evaluated in the same manner as the aforementioned method.

atmosphere, a medium-pressure mercury-vapor lamp, 120 W, 10 kJ/m$^2$), cured products were obtained. From the cured products (plate), sample plates having a size of 10 mm×40 mm×1 mm used for refractive index evaluation described below and sample plates having a size of 15 mm×15 mm×5 mm used for shore D hardness evaluation were produced by cutting, and each evaluation was conducted. The results of the each evaluation are shown below. The refractive index was evaluated using an Abbe refractometer as a value at 450 nm.

The wet heat resistance test was conducted as a hydrolysis resistance test. The cured products obtained were allowed to stand under the conditions of a temperature of 70° C. and

TABLE 3

Evaluation results of the cured films

|  |  |  | Immediately after curing | | | | After hydrolysis resistance test | | | |
|---|---|---|---|---|---|---|---|---|---|---|
|  |  |  | Contact Angle (°) | | | Pencil | Contact Angle (°) | | | Pencil |
|  |  | Composition | H$_2$O | CH$_2$I$_2$ | C$_{12}$H$_{26}$ | hardness | H$_2$O | CH$_2$I$_2$ | C$_{12}$H$_{26}$ | hardness |
| Evaluation | 1 | Ex. 1 | 106 | 79 | 58 | 3H | 103 | 75 | 55 | 3H |
| Examples | 2 | Ex. 2 | 105 | 79 | 59 | 3H | 102 | 75 | 52 | 3H |
|  | 3 | Ex. 3 | 107 | 77 | 54 | 3-4H | 106 | 74 | 50 | 3H |
|  | 4 | Ex. 4 | 105 | 78 | 58 | 3H | 101 | 72 | 53 | 3H |
|  | 5 | Ex. 5 | 106 | 75 | 55 | 4H | 102 | 69 | 53 | 4H |
|  | 6 | Ex. 6 | 108 | 79 | 54 | 4H | 105 | 75 | 49 | 4H |
|  | 7 | Ex. 7 | 105 | 74 | 50 | 3-4H | 104 | 70 | 48 | 3H |
|  | 8 | Ex. 8 | 98 | 68 | 48 | 3H | 95 | 66 | 44 | 2H |
|  | 9 | Ex. 9 | 103 | 70 | 53 | 2-3H | 101 | 68 | 51 | 2-3H |
| Comparative | 1 | Com. Ex. 1 | 99 | 70 | 49 | 3H | 82 | 44 | 25 | 2H |
| Evaluation | 2 | Com. Ex. 2 | 85 | 48 | 25 | 3H | 80 | 41 | 22 | 2-3H |
| Examples | 3 | Com. Ex. 3 | 88 | 49 | 28 | 3-4H | 82 | 40 | 26 | 3-4H |

Evaluation Examples 10 to 17 and Comparative Evaluation Examples 4 to 7

Casting molds which were able to provide a cured test sample having a following size were prepared using glass plates, and each composition was injected into each casting mold so that air bubbles were not included in the composition. After putting a top on each molding with another glass plate and curing the composition with ultraviolet ray (nitrogen humidity of 98% RH for 500 hours, and then refractive index and shore D hardness of the cured products were evaluated. Furthermore, the transmittance at 450 nm was measured, and the maintenance rate of the permeability with respect to an initial value was evaluated.

The maintenance rate of the permeability was calculated by the following expression.

(Maintenance rate of transmittance)=(transmittance after wet heat resistance test)/(initial transmittance)×100

TABLE 4

Evaluation results of cured products

|  |  |  | Immediately after curing | | | After hydrolysis resistance test | |
|---|---|---|---|---|---|---|---|
|  |  | Composition | Transmittance (450 nm, %) | Shore hardness | Refractive index | Maintenance rate of transmittance (%) | Shore hardness |
| Evaluation | 10 | Ex. 10 | 96 | D-48 | 1.460 | 96 | D-47 |
| Examples | 11 | Ex. 11 | 95 | D-52 | 1.461 | 97 | D-50 |
|  | 12 | Ex. 12 | 94 | D-70 | 1.435 | 98 | D-65 |
|  | 13 | Ex. 13 | 95 | D-65 | 1.458 | 97 | D-64 |
|  | 14 | Ex. 14 | 96 | D-58 | 1.455 | 97 | D-50 |
|  | 15 | Ex. 15 | 96 | D-50 | 1.461 | 98 | D-47 |
|  | 16 | Ex. 16 | 95 | D-55 | 1.459 | 96 | D-50 |
|  | 17 | Ex. 17 | 94 | D-68 | 1.465 | 95 | D-66 |
| Comparative | 4 | Com. Ex. 4 | 96 | D-47 | 1.459 | 88 | D-40 |
| Evaluation | 5 | Com. Ex. 5 | 94 | D-38 | 1.466 | 95 | D-35 |
| Examples | 6 | Com. Ex. 6 | 95 | D-35 | 1.550 | 97 | D-33 |
|  | 7 | Com. Ex. 7 | 96 | D-20 | 1.443 | 90 | D-10 or less |

INDUSTRIAL APPLICABILITY

The cured product obtained from the fluorine-containing photocurable composition of the present invention is excellent in surface characteristics, optical characteristics, and mechanical characteristics, and also excellent in long-term stability due to excellent hydrolysis resistance thereof, and therefore it can be suitably used as an optical material, a coating material, and the like.

The invention claimed is:

1. A fluorine-containing photocurable composition containing a (meth)acrylate having a fluorinated alkyl group (A) and a photopolymerization initiator (B); wherein
the (meth)acrylate (A) includes a functional group (A-i) represented by general formula (1) in which a fluorinated alkyl group is included at the terminal end thereof, and two or more (meth)acryloyl groups (A-ii), and
the fluorine atom content in one molecule of the (meth)acrylate (A) is 25% by weight or more, and molecular weight of the (meth)acrylate (A) is 500 to 4000,

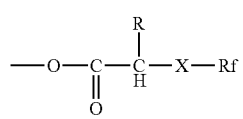  (1)

wherein R represents a hydrogen atom or alkyl group having 1 to 4 carbon atoms; X represents an alkylene chain, which may have a hetero atom, or a connecting group represented by the following general formula (2); and Rf represents a fluorinated alkyl group

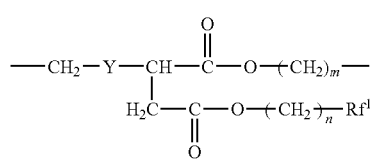  (2)

wherein Y represents an oxygen atom or a sulfur atom; m and n are an integer of 1 to 4 which may be the same or different from each other; and $Rf^1$ is a fluorinated alkyl group.

2. The fluorine-containing photocurable composition according to claim 1, wherein X in the general formula (1) is an alkylene chain represented by the following general formula (3),

  (3)

wherein Z represents —NR—$SO_2$—, wherein R represents a hydrogen atom or alkyl group having 1 to 24 carbon atoms or a sulfur atom, an oxygen atom, or nitrogen atom which has a hydrogen atom or alkyl group having 1 to 24 carbons; p represents an integer of 0 to 4; q represents 0 or 1; r represents an integer of 0 to 20; and 1≦p+r≦20.

3. The fluorine-containing photocurable composition according to claim 1, wherein X in the general formula (1) is an alkylene chain represented by the general formula (3), wherein Z represents —NR—$SO_2$—, wherein R represents a hydrogen atom or alkyl group having 1 to 24 carbon atoms or a sulfur atom an oxygen atom, or a nitrogen atom which has a hydrogen atom or alkyl group having 1 to 24 carbons; p represents 1; q represents 1; and r represents an integer of 0 to 19), or a connecting group represented by the general formula (2), wherein $Rf^1$ represents —$C_nF_{2n+1}$ (n represents an integer of 1 to 20); and $R_f$ in the general formula (1) represents —$C_nF_{2n+1}$ (n represents an integer of 1 to 20) which may be the same as or different from the $Rf^1$.

4. The fluorine-containing photocurable composition according to claim 3, wherein X in the general formula (1) is an alkylene chain represented by the general formula (3), Z represents —NR—$SO_2$—, wherein R represents an alkyl group having 1 to 6 carbon atoms, a sulfur atom or a nitrogen atom or a connecting group represented by the general formula (2) (Y represents a sulfur atom, and the carbon number n of $Rf^1$ is 4, 6 or 8); and the carbon number n of Rf in the general formula (1) is 4, 6 or 8.

5. The fluorine-containing photocurable composition according to claim 1, wherein the (meth)acrylate having a fluorinated alkyl group (A) is a compound which is obtained by reacting a compound (a1) containing three or more (meth)acryloyl groups with a compound represented by the general formula (4), or by reacting a compound (a1) containing three or more (meth)acryloyl groups with a compound (a2) represented by the general formula (5) such that the compound (a2) is used in an amount of 0.01 to (k-2) mole, wherein k represents the average number of (meth)acryloyl groups included in one molecule of the compound (a1)) with respect to 1 mole of the compound (a1), Rf($CH_2$)$_r$ZH  (4)

wherein r represents an integer of 0 to 20; Rf represents —$C_nF_{2n+1}$ (n represents an integer of 1 to 20); and Z represents —$SO_2$—NR—, wherein R represents a hydrogen atom or an alkyl group having 1 to 24 carbon atoms or a sulfur atom, oxygen atom, or nitrogen atom which has a hydrogen atom or alkyl group having 1 to 24 carbon atoms)

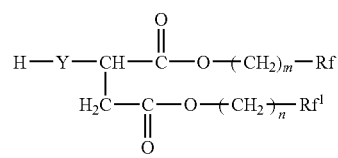  (5)

wherein Y represents an oxygen atom or a sulfur atom; m and n are an integer of 1 to 4 which may be differ from or the same as each other; and Rf and $Rf^1$ represent —$C_nF_{2n+1}$ (n represents an integer of 1 to 20) which may be different from or the same as each other.

6. The fluorine-containing photocurable composition according to claim 5, wherein the compound (a2) is a compound represented wherein (Z represents —$SO_2$—NR—, R represents an alkyl group having 1 to 6 carbon atoms) or a sulfur atom, or nitrogen atom which has a hydrogen atom Or alkyl group having 1 to 6 carbon atoms and carbon number n in Rf is 4, 6, or 8, or a compound represented by the general formula (5), wherein Y represents a sulfur atom, and the carbon number n in Rf and Rf1 is 4, 6, or 8).

7. The fluorine-containing photocurable composition according to claim 5 or 6, wherein the compound (a1) containing three or more (meth)acryloyl groups is at least one selected from the group consisting of: a compound (a1-1) represented by the general formula (6), a compound (a1-2) represented by the general formula (7), a urethane(meth)acrylate (a1-3), a cyanurate ring-containing tri(meth)acrylate (a1-4), and a phosphoric acid tri(meth)acrylate (a1-5),

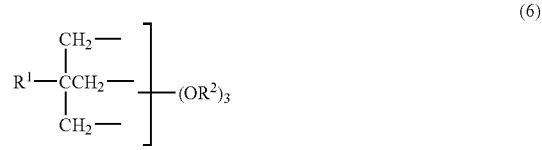  (6)

wherein R¹ represents a hydroxyl group, an alkyl group having 1 to 24 carbon atoms, an alkyl carbonyloxy group having 1 to 24 carbon atoms, $CH_2=CHCO_2CH_2-$, $CH_2=C(CH_3)CO_2CH_2-$, a (poly)oxyalkylene group, wherein the number of repeating units is one or more and terminal end thereof is blocked with a hydrogen atom or alkyl group having 1 to 18 carbon atoms, or an alkylol group having 1 to 12 carbon atoms; and R² represents an (meth)acryloyl group

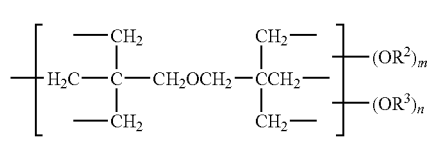
(7)

wherein R² represents a (meth)acryloyl group; R³ represents a hydrogen atom or alkyl carbonyl group having 1 to 18 carbon atoms; m represents an integer of 3 to 6; n represents an integer of 0 to 3; and m+n=6.

8. The fluorine-containing photocurable composition according to claim 7, wherein the compound (a1) containing three or more (meth)acryloyl groups is a compound represented by the general formula (6), wherein R¹ represents a straight chain alkyl group having 1 to 4 carbon atoms, $CH_2=CHCO_2CH_2-$, $CH_2=C(CH_3)CO_2CH_2-$, or alkylol group having 1 to 3 carbon atoms, a compound represented by the general formula (7), wherein, R³ represents a hydrogen atom or alkyl carbonyl group having 1 to 12 carbon atoms, or urethane(meth)acrylate which can be obtained by reacting a hydroxyl group-containing (meth)acrylate (x1) which has two or more (meth)acryloyl groups and an isocyanate compound (x2) which has an alicyclic structure.

* * * * *